US009871718B2

(12) United States Patent
Liu

(10) Patent No.: US 9,871,718 B2
(45) Date of Patent: Jan. 16, 2018

(54) METHOD AND DEVICE FOR REGISTERING MULTICAST SOURCE AND ESTABLISHING MULTICAST PATH

(71) Applicant: ZTE Corporation, Shenzhen, Guangdong Province (CN)

(72) Inventor: Juan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 244 days.

(21) Appl. No.: 14/759,297

(22) PCT Filed: Nov. 25, 2013

(86) PCT No.: PCT/CN2013/001440
§ 371 (c)(1),
(2) Date: Jul. 6, 2015

(87) PCT Pub. No.: WO2014/106314
PCT Pub. Date: Jul. 10, 2014

(65) Prior Publication Data
US 2015/0358226 A1   Dec. 10, 2015

(30) Foreign Application Priority Data

Jan. 6, 2013  (CN) .......................... 2013 1 0003151

(51) Int. Cl.
*H04L 12/751* (2013.01)
*H04W 28/06* (2009.01)
(Continued)

(52) U.S. Cl.
CPC .............. *H04L 45/02* (2013.01); *H04L 12/18* (2013.01); *H04L 12/1886* (2013.01);
(Continued)

(58) Field of Classification Search
CPC ..... H04L 45/02; H04L 12/18; H04L 12/1886; H04L 45/16; H04L 2212/00; H04W 28/065
(Continued)

(56) References Cited

U.S. PATENT DOCUMENTS

2009/0080352 A1*  3/2009  Yoneda ................ H04L 12/189
                                                    370/312
2010/0265869 A1* 10/2010  Sarikaya ............. H04L 12/1836
                                                    370/312
2013/0089093 A1*  4/2013  Bacthu ................ H04L 12/4633
                                                    370/390

FOREIGN PATENT DOCUMENTS

CN  101309163 A  11/2008
CN  101330448 A  12/2008
(Continued)

OTHER PUBLICATIONS

International Search Report of PCT/CN2013/001440, dated Feb. 27, 2014.
(Continued)

*Primary Examiner* — Obaidul Huq
(74) *Attorney, Agent, or Firm* — Banner & Witcoff, Ltd.

(57) ABSTRACT

A method and device for registering a multicast source and establishing a multicast path are disclosed. The method includes: after receiving a multicast message of a multicast source, a designated router DR to which the multicast source belongs encapsulating a multicast header for the multicast message, wherein a target address of the multicast header is a multicast address, and a source address of the multicast header is a proxy care-of address of the multicast source; and after encapsulating the multicast header for the multicast message, encapsulating the multicast message as a registration message to send to a rendezvous point. In the embodiments of the present document, with the proxy care-of
(Continued)

address of the multicast source in a PMIPv6 domain, and by the provided method for establishing the multicast path, the multicast routing efficiency and the multicast performance can be improved.

6 Claims, 14 Drawing Sheets

(51) Int. Cl.
H04L 12/18 (2006.01)
H04L 12/761 (2013.01)

(52) U.S. Cl.
CPC .......... *H04L 45/16* (2013.01); *H04W 28/065* (2013.01); *H04L 2212/00* (2013.01)

(58) Field of Classification Search
USPC ............... 370/310, 328, 338, 351, 389, 390
See application file for complete search history.

(56) References Cited

FOREIGN PATENT DOCUMENTS

| CN | 101547110 A | 9/2009 |
| CN | 101577679 A | 11/2009 |
| EP | 1289223 A2 | 3/2003 |
| EP | 2124388 A1 | 11/2009 |
| EP | 2439886 A1 | 4/2012 |

OTHER PUBLICATIONS

Romdhani, et al., "IP Mobile Multicast: Challenges and Solutions", IEEE Communications Surveys, The Electronic Magazine of Original Peer-Reviewed Survey Articles, First Quarter 2004, vol. 6, No. 1, 24 pages.

Schmidt, et al., "Mobile Multicast Sender Support in Proxy Mobile IPv6 (PMIPv6) Domains draft-ieff-multimob-pmipv6-source-02", Mijltimob Group, Internet-Draft dated Oct. 22, 2012, 26 pages.

Communication with Partial European Search Report for EP13869887.3 dated Apr. 11, 2016.

European Search Report of EP 13869887, dated Aug. 5, 2016.

\* cited by examiner

METHOD AND DEVICE FOR REGISTERING MULTICAST SOURCE AND ESTABLISHING MULTICAST PATH

TECHNICAL FIELD

The present document relates to the field of mobile communication, and particularly, to a method and device for registering a multicast source and establishing a multicast path.

BACKGROUND OF THE RELATED ART

The appearance of multicast is to solve an efficiency problem occurring when the traditional unicast routing processes group communication. With the development of the wireless and mobile technology, acquiring a multicast service during the mobile process becomes a research hotspot, and mobile multicast is developed from the traditional fixed multicast and provides various applications such as mobile video conferences and mobile online games and so on for mobile subscribers, which can effectively improve the data transmission efficiency. The mobile multicast is required to solve two basic problems: the first is group member relationship management, and the second is group member location management. At present, generally protocols such as an Internet Group Management Protocol (IGMP)/Multicast Listener Discovery (MLD) Protocol are used in the group member relationship management, and mobility management protocols such as a mobile Internet Protocol (IP) are used in the group member location management.

IP multicast service models are divided into two kinds: Any-Source Multicast (ASM) and Source-Specific Multicast (SSM). The ASM model uses a multicast address to identify a multicast group, each multicast group can have arbitrary multiple multicast sources and receivers, it is required to establish a Rendezvous Point Tree (RPT) by using a Rendezvous Point (RP), and establish a Shortest Path Tree (SPT) through a multicast source registration mechanism, the ASM model is applicable to a video conference and P2P game and so on in which multiple parties participate, thus the multiple multicast sources send data to the same group (that is, multi-to-multi). The SSM is combined with the MLDv2/IGMPv3, a multicast address G and a multicast source address S are used to identify a multicast session, which is also called as a channel, each channel can only have a specific source and arbitrary multiple receivers. In the SSM model, it is not required to select a rendezvous point RP and maintain a rendezvous point tree RPT, and it is not required to perform multicast source registration, thus an SPT with the multicast source S as a root and the receivers as leaves is directly constructed in the network, a process of firstly establishing the rendezvous point tree and then performing switching from the rendezvous point tree to the shortest path tree in the PIM-SM is omitted, and the data can be forwarded along the shortest path tree from the beginning, the SSM is particularly applicable to point-to-multipoint multicast services, such as a network entertainment channel, a network news channel and a network sport channel and so on.

In order to process the same multicast information from different opposite ends received by the same router at different interfaces, it is required to perform Reverse Path Forwarding (RPF) check on an incoming interface of a multicast message, so as to decide whether to forward or discard the message.

With regard to the mobile multicast, the IETF is dedicated to studying a mobile multicast mechanism based on the PMIPv6 in the MULTIMOB working group, a basic solution has been proposed at present, and an implementation process of the solution will be introduced in combination with the accompanying drawing below. As shown in FIG. 1, a multicast source Mobile Node (MN)1 and a multicast listener MN2 are respectively attached to a Mobile Access Gateway (MAG)1 and an MAG2, the multicast source MN1 sends a multicast message to a multicast group, the MN2 intercepts the multicast data sent to the multicast group, and an S-HoA represents a home address of the MN1. In the ASM model, the MN2 notifies a DR2 (MAG2) directly connected to the MN2 to apply for joining the multicast group through an MLD message, the Designated Router (DR2) sends a join message hop by hop in an RP direction corresponding to the group, routers passed from the DR2 to the RP form an RPT branch, all these routers generate a (*, G) table entry in their forwarding tables, the "*" here represents that it is from any multicast source, and the RPT takes the RP as a root and the DR2 as a leaf. When the multicast source MN1 sends a multicast message to the multicast group, a DR1 (MAG1) directly connected to the multicast source receives the message and then encapsulates the message as a registration message, and sends the message to a corresponding RP by means of unicast, after the RP receiving the message, on the one hand, it decapsulates the registration message and forwards the multicast message encapsulated in the registration message to the receivers along the RPT, on the other hand, it sends a (S-HoA, G) join message hop by hop in a multicast source direction, due to a particularity of the PMIPv6 routing, the join message is routed to a Local Mobility Anchor (LMA) and finally sent to the MAG1 through a bi-directional PMIPv6 tunnel between the LMA and the MAG1, therefore, routers passed from the RP to the LMA form a branch of the SPT, all these routers generate a (S-HoA, G) table entry in their forwarding tables, the SPT takes the LMA of the multicast source as a root and the RP as a leaf, and a multicast path from the LMA to the DR1 (MAG1) of the multicast source side is the PMIPv6 tunnel.

In order to enhance the reliability of RP nodes in the PIM-SM and share multicast traffics in the network, a plurality of RP nodes can be selected in the network, and an Anycast-RP operates, so as to achieve the purpose of redundancy backup and load sharing. As shown in FIG. 2, RP nodes closest to the MN1, MN2 and MN3 are respectively an RP1, RP2 and RP3, the RP1, RP2 and RP3 form an Anycast-RP Set, each router in the Anycast-RP Set is configured with the same RP address on a loopback interface, and is also configured with a local address unique in the whole network to interact with other routers within the Set. The multicast listeners MN2 and MN3 respectively send a group member join message in the nearest RP2 direction and RP3 direction in the topology, the multicast source MN1 performs multicast source registration to the nearest RP1 node in the topology, a DR1 (MAG1) sends a registration message to the RP1, the RP1 decapsulates the registration message after receiving the registration message sent by the DR1, re-encapsulates and then forwards the message to other routers within the Set, a source address is set as a local address of the RP1 itself, a target address is set as a local address of the opposite-end router, thus the RP2 and RP3 all perceive the existence of the multicast source MN1, the RP2 and RP3 decapsulate the registration message and forward the multicast message to the listeners MN2 and MN3 respectively in the directions of their own RPTs on the one hand, and on the other hand, initiate an establishment of an SPT tree in the direction of the multicast source MN1, and send a registration stop message to the RP1, the SPT takes the LMA as a root, and a multicast path from the LMA to the DR1 (MAG1) of the multicast source side is an PMIPv6 tunnel.

As shown in FIG. 3, an MN4 is a multicast listener of another PIM-SM domain, and interconnection is performed through the MBGP between domains. In the ASM model, a DR4 (MAG4) directly connected to the MN4 perceives the cross-domain RP information through an Embedded RP mechanism, an Embedded RP uses a multicast address based on an extended unicast prefix, and an RP address is carried in the multicast address, thereby achieving the purpose that the whole network learns the RP address.

With regard to the SSM model in the above three scenarios, the multicast listeners (MN2, MN3, MN4) report to the DRs directly connected to the multicast listeners through an MLDv2 message that they are interested in the information coming from the multicast source MN1 and sent to the multicast group, the DRs send a Subscribe Message of a Channel hop by hop in a direction of the multicast source MN1, a (S-HoA, G) table entry is established on all routers along the way, thus an SPT with the LMA as a root and the DRs (DR2, DR3, DR4) of the receiver side as leaves is constructed within the network, and a multicast path from the LMA to the DR (MAG1) of the multicast source side is an PMIPv6 tunnel.

In conclusion, all PIM routers construct a multicast tree with the home address S-HoA of the multicast source MN1, the multicast data are all required to firstly reach the LMA via the PMIPv6 channel, and then are distributed to all multicast listeners along the multicast tree, the LMA becomes a fixed anchor of the multicast data, and a multicast forwarding path is not the shortest path, thus the routing efficiency is reduced, especially when the network tends to flattening, and locations of all the mobile nodes are far away from an anchor LMA of the mobile nodes, a more serious path roundabout will exist in the multicast forwarding path, thus a longer data transmission delay is caused, on the other hand, a large number of control messages and multicast data messages of multicast are converged to the LMA, so that the LMA becomes a performance bottleneck, which easily causes a single point of failure and affects a multicast service experience.

SUMMARY

The technical problem required to be solved by the present document is to provide a method and device for registering a multicast source and establishing a multicast path, which can solve a problem of low routing efficiency caused by needing to go through a non-shortest SPT path of a local mobility anchor.

In order to solve the above technical problem, a method for registering a multicast source of the present document comprises:

after receiving a multicast message of a multicast source, a designated router DR to which the multicast source belongs encapsulating a multicast header for the multicast message, wherein a target address of the multicast header is a multicast address, and a source address of the multicast header is a proxy care-of address of the multicast source; and after encapsulating the multicast header for the multicast message, encapsulating the multicast message as a registration message to send to a rendezvous point.

Preferably, the DR to which the multicast source belongs is a mobile access gateway MAG to which the multicast source belongs, and the proxy care-of address of the multicast source is an address of the MAG to which the multicast source belongs.

Preferably, encapsulating the multicast message as a registration message to send to a rendezvous point comprises:

after encapsulating the multicast message as the registration message, the MAG to which the multicast source belongs sending the registration message to the rendezvous point by means of unicast, wherein a source address in an outer-layer encapsulation of the registration message is the address of the MAG, and a target address in an outer-layer encapsulation of the registration message is an address of the rendezvous point.

Preferably, encapsulating the multicast message as a registration message to send to a rendezvous point comprises:

after encapsulating the multicast message as the registration message, the MAG to which the multicast source belongs sending the registration message by means of anycast, wherein a source address in an outer-layer encapsulation of the registration message is the address of the MAG to which the multicast source belongs, and a target address in an outer-layer encapsulation of the registration message is an anycast address of a anycast-rendezvous point set.

A method for forwarding a multicast message comprises:

after receiving a multicast message sent by a rendezvous point, a designated router DR to which a multicast listener belongs removing a multicast header of the multicast message, and sending an original multicast message to the multicast listener, wherein, a target address of the multicast header is a multicast address, and a source address of the multicast header is a proxy care-of address of a multicast source.

A method for establishing a multicast path comprises:

after receiving a registration message sent by a designated router DR to which a multicast source belongs, a rendezvous point removing an outer-layer encapsulation of the registration message, and obtaining a multicast header of an inner layer, wherein a source address of the multicast header is a proxy care-of address S-pCoA of the multicast source, and a target address of the multicast header is a multicast address G; and the rendezvous point sending a join message to the DR to which the multicast source belongs, and establishing a shortest path tree SPT branch between the rendezvous point and the DR to which the multicast source belongs, wherein, routers passed along the SPT branch generate a (S-pCoA, G) multicast forwarding table entry.

Preferably, the DR to which the multicast source belongs is a mobile access gateway MAG to which the multicast source belongs, and the proxy care-of address of the multicast source is an address of the MAG to which the multicast source belongs.

A method for forwarding a multicast message comprises:

after receiving a multicast message sent by a multicast source, a designated router DR to which the multicast source belongs encapsulating a multicast header for the multicast message, wherein a target address of the multicast header is a multicast address G, and a source address of the multicast header is a proxy care-of address S-pCoA of the multicast source; and forwarding a multicast message for which the multicast header is encapsulated according to a generated (S-pCoA, G) multicast forwarding table entry, wherein, the multicast message reaches a rendezvous point along a shortest path tree SPT branch, and all routers passed along the SPT branch forward the multicast message for which the multicast header is encapsulated according to the generated (S-pCoA, G) multicast forwarding table entry.

A method for establishing a multicast path comprises:

after receiving a message of applying for joining a channel sent by a multicast listener, a designated router DR to which the multicast listener belongs querying a local mobility anchor LMA to obtain a proxy care-of address S-pCoA of a multicast source, and generating a (S-pCoA, multicast address G) multicast forwarding table entry; and the DR to which the multicast listener belongs sending a channel subscribe message hop by hop in a multicast source direction corresponding to a channel (S-pCoA, G), and establishing a shortest path tree SPT branch between the DR to which the multicast listener belongs and a DR to which the multicast source belongs, wherein, routers passed along the SPT branch and the DR to which the multicast source belongs generate a (S-pCoA, G) multicast forwarding table entry.

A method for forwarding a multicast message comprises:

after receiving a multicast message of a multicast source, a designated router DR to which the multicast source belongs encapsulating a multicast header for the multicast message, wherein a target address of the multicast header is a multicast address G, and a source address of the multicast header is a proxy care-of address S-pCoA of the multicast source; and according to a generated (S-pCoA, G) multicast forwarding table entry, through a shortest path tree SPT branch between the DR to which the multicast source belongs and a DR to which a multicast listener belongs, the DR to which the multicast source belongs forwarding a multicast message for which the multicast header is encapsulated to the DR to which the multicast listener belongs.

Preferably, the method further comprises: after receiving the multicast message, the DR to which the multicast listener belongs querying the generated (S-pCoA, G) multicast forwarding table entry to perform a reverse path forwarding RPF check, after the check is passed, removing the multicast header of the multicast message, and according to the generated (home address S-HoA of multicast source, G) forwarding table entry, sending an original multicast message to the multicast listener.

A method for registering a multicast source comprises: a designated router DR to which a multicast source belongs registering a binding relationship between a home address of the multicast source and a proxy care-of address of the multicast source to a border multicast router BMR, and completing a registration of the binding relationship between the home address of the multicast source and the proxy care-of address of the multicast source.

Preferably, the method further comprises: when the multicast source is moving, a DR to which the multicast source moves registering an updated binding relationship between the proxy care-of address of the multicast source and the home address of the multicast source to the BMR.

A method for forwarding a multicast message comprises:

a border multicast router BMR receiving a multicast message for which a multicast header is encapsulated sent by a rendezvous point RP, wherein a target address of the multicast header is a multicast address, and a source address of the multicast header is a proxy care-of address of a multicast source; and the BMR looking up a binding relationship between a home address of the multicast source and the proxy care-of address of the multicast source according to the proxy care-of address of the multicast source, looking up a multicast forwarding table entry according to the home address of the multicast source, when outgoing interface information corresponding to the multicast forwarding table entry indicates that it is required to forward towards outward of a domain, decapsulating the multicast header of an outer layer of the multicast message, and according to the outgoing interface information corresponding to the multicast forwarding table entry, sending an original multicast message obtained through the decapsulation to a designated router DR to which a multicast listener outside a domain belongs.

A method for establishing a multicast path comprises:

after receiving a subscribe message sent by a multicast listener outside a domain of a multicast source, a border multicast router BMR looking up a binding relationship between a home address of the multicast source and a proxy care-of address S-pCoA of the multicast source according to the home address of the multicast source in the subscribe message, obtaining the S-pCoA of the multicast source, and generating a (S-pCoA, multicast group address G) multicast forwarding table entry; and the BMR sending a channel subscribe message hop by hop in a multicast source direction corresponding to a channel (S-pCoA, G), and establishing a shortest path tree SPT branch between the BMR and a designated router DR to which the multicast source belongs, wherein, routers passed along the SPT branch and the DR to which the multicast source belongs generate a (S-pCoA, G) multicast forwarding table entry.

Preferably, an outgoing interface list corresponding to the (S-pCoA, G) multicast forwarding table entry generated by the BMR is for interfaces for the BMR receiving the channel subscribe message.

A method for forwarding a multicast message comprises:

a border multicast router BMR receiving a multicast message for which a multicast header is encapsulated sent by a designated router DR to which a multicast source belongs, wherein a target address of the multicast header is a multicast address G, and a source address of the multicast header is a proxy care-of address S-pCoA of the multicast source; and the BMR decapsulating the multicast header of an outer layer of the multicast message, querying a generated (S-pCoA, G) multicast forwarding table entry, and sending an original multicast message obtained through the decapsulation to a DR to which a multicast listener outside a domain belongs.

Preferably, the method further comprises: before decapsulating the multicast header of the outer layer of the multicast message, the BMR querying the (S-pCoA, G) multicast forwarding table entry, performing reverse path forwarding RPF check, and after the check is passed, decapsulating the multicast header of the outer layer of the multicast message.

Preferably, the BMR receiving a multicast message for which a multicast header is encapsulated sent by an MAG to which a multicast source belongs comprises: after receiving the multicast message sent by the multicast source, the DR to which the multicast source belongs encapsulating the multicast header for the multicast message, and according to the generated (S-pCoA, G) multicast forwarding table entry, through a shortest path tree SPT branch between the DR to which the multicast source belongs and the BMR, sending the multicast message for which the multicast header is encapsulated to the BMR.

A method for registering a multicast source comprises: after receiving a multicast message of a multicast source, a designated router DR to which the multicast source belongs encapsulating the multicast message as a registration message, sending the registration message to a rendezvous point RP, wherein a proxy care-of address of the multicast source and a path establishment flag bit are carried in the registration message, the path establishment flag bit is used for indicating the RP to establish a shortest path tree SPT branch between the RP and the DR to which the multicast source belongs according to the proxy care-of address of the multicast source.

Preferably, the method further comprises:
after receiving the registration message, according to the path establishment flag bit, the RP saving a binding relationship between the proxy care-of address of the multicast source carried in the registration message and a home address of the multicast source.

A method for establishing a multicast path comprises:
after receiving a registration message of a multicast listener, a rendezvous point RP sending a join message with a protocol independent multicast PIM join attribute hop by hop in a multicast source direction, wherein a proxy care-of address of a multicast source is carried in the PIM join attribute; triggering a designated router DR to which the multicast source belongs and routers passed by the join message to perform reverse path forwarding RPF check according to the proxy care-of address of the multicast source carried in the PIM join attribute, and completing an establishment of a shortest path tree SPT branch between the RP and the DR to which the multicast source belongs.

A method for establishing a multicast path comprises:
after receiving a message of applying for joining a channel sent by a multicast listener, a designated router DR to which the multicast listener belongs sending a join message with a protocol independent multicast PIM join attribute hop by hop in a multicast source direction, wherein a proxy care-of address of a multicast source is carried in the PIM join attribute; triggering a DR to which the multicast source belongs and routers passed by the join message to perform reverse path forwarding RPF check according to the proxy care-of address of the multicast source carried in the PIM join attribute, and completing an establishment of a shortest path tree SPT branch between the DR to which the multicast listener belongs and the DR to which the multicast source belongs.

Preferably, the method further comprises: after receiving a multicast message sent by the multicast source, through the SPT branch between the DR to which the multicast source belongs and the DR to which the multicast listener belongs, the DR to which the multicast source belongs forwarding the multicast message to the DR to which the multicast listener belongs, wherein, all routers along the SPT branch perform reverse path forwarding RPF check according to the proxy care-of address of the multicast source.

A method for establishing a multicast path comprises:
after receiving a channel subscribe message sent by a multicast listener outside a domain of a multicast source, according to a home address of the multicast source, a local mobility anchor LMA looking up a local binding cache table entry to obtain a proxy care-of address corresponding to the home address of the multicast source; and
the LMA adding a protocol independent multicast PIM join attribute into the channel subscribe message, wherein the proxy care-of address of the multicast source is carried in the PIM join attribute; sending a channel subscribe message in which the PIM join attribute is added hop by hop in a multicast source direction, triggering a designated router DR to which the multicast source belongs and routers passed by the channel subscribe message to perform RPF check according to the proxy care-of address of the multicast source, and completing an establishment of a shortest path tree SPT branch between the LMA and the DR to which the multicast source belongs.

Preferably, the method further comprises:
after receiving a multicast message sent by the multicast source, the DR to which the multicast source belongs forwarding the multicast message to the LMA through the SPT branch between the DR to which the multicast source belongs and the LMA, wherein, all routers along the SPT branch perform RPF check according to the proxy care-of address of the multicast source and forward the multicast message; and
after receiving the multicast message, the LMA forwarding the multicast message to a DR to which the multicast listener belongs.

A device for registering a multicast source comprises: a receiving unit, an encapsulating unit and a sending unit, wherein:
the receiving unit is configured to: receive a multicast message of the multicast source;
the encapsulating unit is configured to: encapsulate a multicast header for the multicast message, wherein a target address of the multicast header is a multicast address, and a source address of the multicast header is a proxy care-of address of the multicast source; and after encapsulating the multicast header for the multicast message, encapsulate the multicast message as a registration message; and
the sending unit is configured to: send the registration message to a rendezvous point.

Preferably, the proxy care-of address of the multicast source is an address of a mobile access gateway MAG to which the multicast source belongs.

A device for forwarding a multicast message comprises: a receiving unit, a decapsulating unit and a sending unit, wherein:
the receiving unit is configured to: receive a multicast message sent by a rendezvous point;
the decapsulating unit is configured to: remove a multicast header of the multicast message, and obtain an original multicast message, wherein, a target address of the multicast header is a multicast address, and a source address of the multicast header is a proxy care-of address of a multicast source; and
the sending unit is configured to: send the original multicast message to a multicast listener.

A device for establishing a multicast path comprises: a receiving unit, a decapsulating unit and a sending unit, wherein:
the receiving unit is configured to: receive a registration message sent by a designated router DR to which a multicast source belongs;
the decapsulating unit is configured to: remove an outer-layer encapsulation of the registration message, and obtain a multicast header of an inner layer, wherein a source address of the multicast header is a proxy care-of address S-pCoA of the multicast source, and a target address of the multicast header is a multicast address G; and
the sending unit is configured to: send a join message to the DR to which the multicast source belongs, and establish a shortest path tree SPT branch between with the DR to which the multicast source belongs, wherein, routers passed along the SPT branch generate a (S-pCoA, G) multicast forwarding table entry.

A device for forwarding a multicast message comprises: a receiving unit, an encapsulating unit and a sending unit, wherein:

the receiving unit is configured to: receive a multicast message sent by a multicast source;

the encapsulating unit is configured to: encapsulate a multicast header for the multicast message, wherein a target address of the multicast header is a multicast address G, and a source address of the multicast header is a proxy care-of address S-pCoA of the multicast source; and the sending unit is configured to: forward a multicast message for which the multicast header is encapsulated according to a generated (S-pCoA, G) multicast forwarding table entry, wherein, the multicast message reaches a rendezvous point along a shortest path tree SPT branch, and all routers passed along the SPT branch forward the multicast message for which the multicast header is encapsulated according to the generated (S-pCoA, G) multicast forwarding table entry.

A device for establishing a multicast path comprises: a receiving unit, a table entry generating unit and a sending unit, wherein:

the receiving unit is configured to: receive a message of applying for joining a channel sent by a multicast listener;

the table entry generating unit is configured to: query a local mobility anchor LMA to obtain a proxy care-of address S-pCoA of a multicast source, and generate a (S-pCoA, multicast address G) multicast forwarding table entry; and the sending unit is configured to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry.

A device for forwarding a multicast message comprises: a receiving unit, an encapsulating unit and a sending unit, wherein:

the receiving unit is configured to: receive a multicast message of a multicast source;

the encapsulating unit is configured to: encapsulate a multicast header for the multicast message, wherein a target address of the multicast header is a multicast address G, and a source address of the multicast header is a proxy care-of address S-pCoA of the multicast source; and the sending unit is configured to: according to a generated (S-pCoA, G) multicast forwarding table entry, through a shortest path tree SPT branch between with a designated router DR to which a multicast listener belongs, forward a multicast message for which the multicast header is encapsulated to the DR to which the multicast listener belongs.

A device for forwarding a multicast message comprises: a receiving unit, a decapsulating unit and a sending unit, wherein:

the receiving unit is configured to: receive a multicast message;

the decapsulating unit is configured to: query a generated (S-pCoA, G) multicast forwarding table entry to perform reverse path forwarding RPF check, after the check is passed, remove a multicast header of the multicast message, and obtain an original multicast message; and the sending unit is configured to: according to the generated (home address S-HoA of multicast source, G) forwarding table entry, send the original multicast message to a multicast listener.

A device for registering a multicast source comprises: a registration unit, wherein:

the registration unit is configured to: register a binding relationship between a home address of the multicast source and a proxy care-of address of the multicast source to a border multicast router BMR, and complete a registration of the binding relationship between the home address of the multicast source and the proxy care-of address of the multicast source.

A device for forwarding a multicast message comprises: a receiving unit, a decapsulating unit and a sending unit, wherein:

the receiving unit is configured to: receive a multicast message for which a multicast header is encapsulated sent by a rendezvous point RP, wherein a target address of the multicast header is a multicast address, and a source address of the multicast header is a proxy care-of address of a multicast source; and the decapsulating unit is configured to: look up a binding relationship between a home address of the multicast source and the proxy care-of address of the multicast source according to the proxy care-of address of the multicast source, looking up a multicast forwarding table entry according to the home address of the multicast source, and when outgoing interface information corresponding to the multicast forwarding table entry indicates that it is required to forward towards outward of a domain, decapsulate the multicast header of an outer layer of the multicast message; and the sending unit is configured to: according to the outgoing interface information corresponding to the multicast forwarding table entry, send an original multicast message obtained through the decapsulation to a designated router DR to which a multicast listener outside a domain belongs.

A device for establishing a multicast path comprises: a receiving unit, a table entry generating unit and a sending unit, wherein:

the receiving unit is configured to: receive a subscribe message sent by a multicast listener outside a domain of a multicast source;

the table entry generating unit is configured to: look up a binding relationship between a home address of the multicast source and a proxy care-of address S-pCoA of the multicast source according to the home address of the multicast source in the subscribe message, obtain the S-pCoA of the multicast source, and generate a (S-pCoA, multicast group address G) multicast forwarding table entry; and the sending unit is configured to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry.

A device for forwarding a multicast message comprises: a receiving unit, a decapsulating unit and a sending unit, wherein:

the receiving unit is configured to: receive a multicast message for which a multicast header is encapsulated sent by a designated router DR to which a multicast source belongs, wherein a target address of the multicast header is a multicast address G, and a source address of the multicast header is a proxy care-of address S-pCoA of the multicast source;

the decapsulating unit is configured to: decapsulate the multicast header of an outer layer of the multicast message; and the sending unit is configured to: query a generated (S-pCoA, G) multicast forwarding table entry, and send an original multicast message obtained through the decapsulation to a DR to which a multicast listener outside a domain belongs.

A device for registering a multicast source comprises: a receiving unit, an encapsulating unit and a sending unit, wherein:

the receiving unit is configured to: receive a multicast message of a multicast source;

the encapsulating unit is configured to: encapsulate the multicast message as a registration message; and the sending unit is configured to: send the registration message to a rendezvous point RP, wherein a proxy care-of address of the multicast source and a path establishment flag bit are carried in the registration message, the path establishment flag bit is used for indicating the RP to establish a shortest path tree SPT branch between the RP and a designated router DR to which the multicast source belongs according to the proxy care-of address of the multicast source.

A device for establishing a multicast path comprises: a receiving unit and a sending unit, wherein:

the receiving unit is configured to: receive a registration message of a multicast listener; and the sending unit is configured to: send a join message with a protocol independent multicast PIM join attribute hop by hop in a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs.

A device for establishing a multicast path comprises: a receiving unit and a sending unit, wherein:

the receiving unit is configured to: receive a message of applying for joining a channel sent by a multicast listener; and the sending unit is configured to: send a join message with a protocol independent multicast PIM join attribute hop by hop in a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs.

A device for establishing a multicast path comprises: a receiving unit, a querying unit and a sending unit, wherein:

the receiving unit is configured to: receive a channel subscribe message sent by a multicast listener outside a domain of a multicast source;

the querying unit is configured to: according to a home address of the multicast source, look up a local binding cache table entry to obtain a proxy care-of address corresponding to the home address of the multicast source, and add a protocol independent multicast PIM join attribute into the channel subscribe message, wherein the proxy care-of address of the multicast source is carried in the PIM join attribute; and the sending unit is configured to: send a channel subscribe message in which the PIM join attribute is added hop by hop in a multicast source direction, trigger a designated router DR to which the multicast source belongs and routers passed by the channel subscribe message to perform RPF check according to the proxy care-of address of the multicast source, and complete an establishment of a shortest path tree SPT branch between with the DR to which the multicast source belongs.

In conclusion, in the embodiments of the present document, with the proxy care-of address of the multicast source in a PMIPv6 domain, and through the provided method for establishing the multicast path, the multicast routing efficiency and the multicast performance can be improved.

PREFERRED EMBODIMENTS OF THE INVENTION

Embodiment 1

Figure 4:
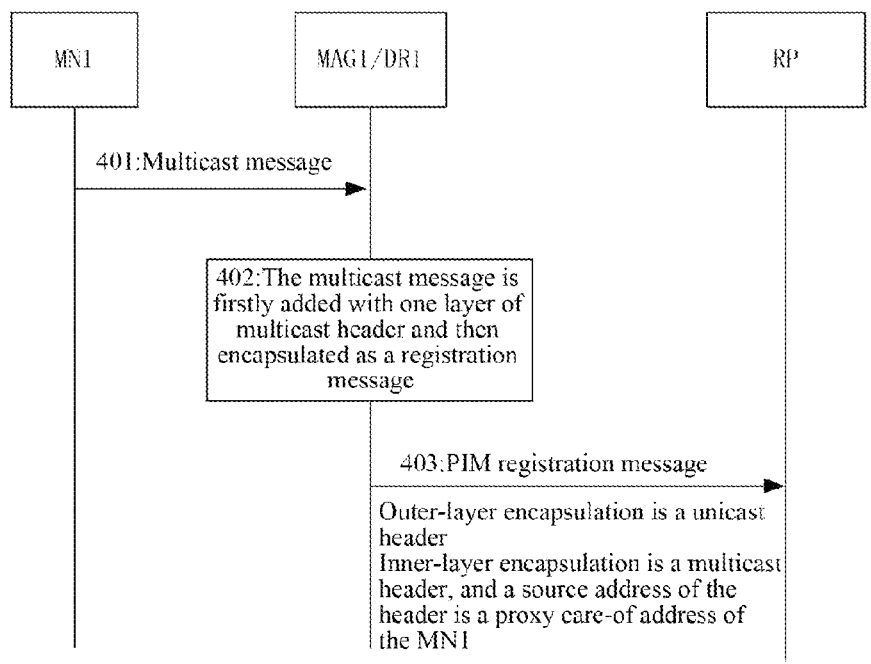
FIG. 4 is a flow chart of a method for registering a multicast source according to the embodiment 1 of the present document.

FIG. 4 is a method for registering a multicast source according to the embodiment, an MN1 is a multicast source attaching to an MAG1, and the MAG1 serves as a DR of the MN1. As shown in FIG. 4, the following steps are specifically included.

In step 401, a multicast source MN1 sends a multicast message to a multicast group, a target address of the message is a multicast address G of the multicast group, and a source address of the message is a home address S-HoA of the MN1.

In step 402, after receiving the multicast message, an MAG1 directly connected to the MN1 encapsulates another layer of multicast header, a target address of the encapsulated header is the multicast address G of the original multicast message, and a source address of the encapsulated header is set as a proxy care-of address S-pCoA of the MN1, namely an address of the MAG1.

In step 403, the MAG1 encapsulates the modified multicast message as a registration message, and sends the registration message to an RP by means of unicast, the registration message contains two layers of encapsulation at this point, unicast encapsulation is performed on the outer layer according to a PIM protocol, a source address is the address of the MAG1, and a target address is an address of the RP; and multicast encapsulation is performed on the inner layer by means of the step 402, a source address is the proxy care-of address S-pCoA of the MN1, namely the address of the MAG1, and a target address is the multicast address G.

In the embodiment, through the above steps, a source-end DR registers a currently active multicast source to the RP, and from the perspective of the RP, an address of the multicast source is the S-pCoA currently.

Embodiment 2

Figure 1:
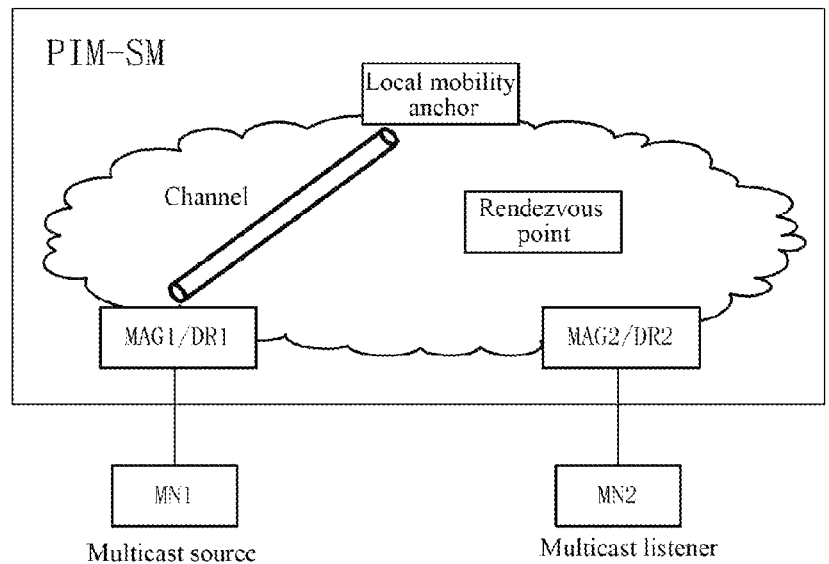
FIG. 1 is a schematic diagram of a scenario of intra-domain multicast in the PMIPv6 deployment in the related art.
Figure 2:
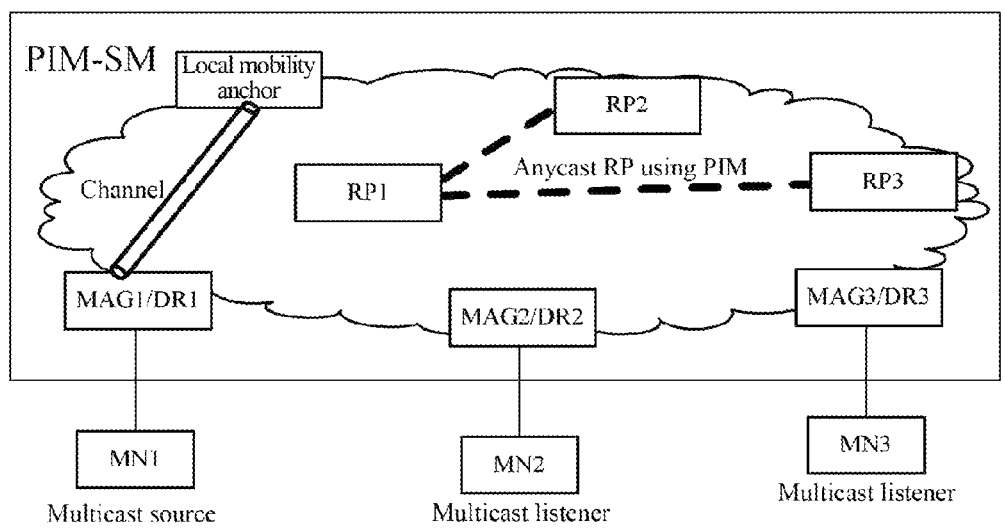
FIG. 2 is a schematic diagram of a scenario of Anycast-RP intra-domain multicast in the PMIPv6 deployment in the related art.
Figure 5:
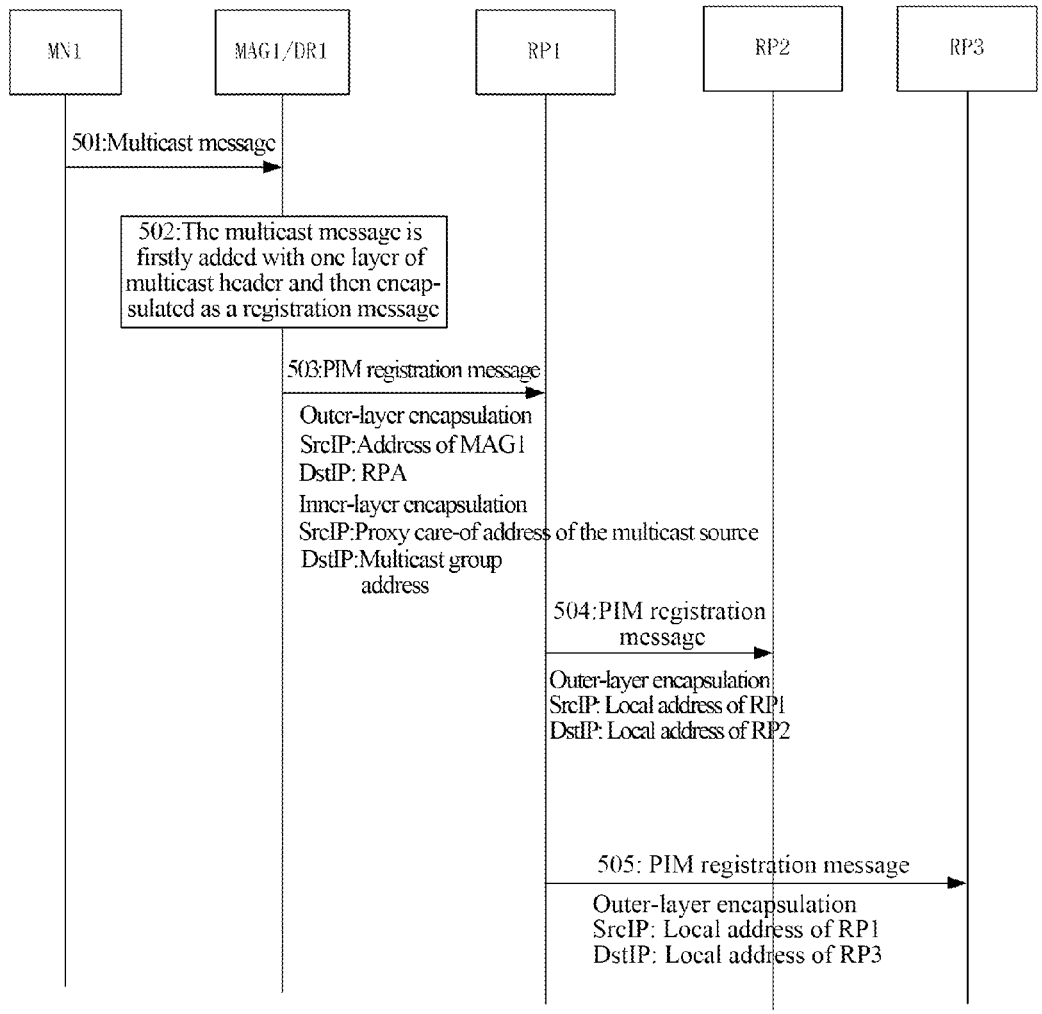
FIG. 5 is a flow chart of a method for registering a multicast source according to the embodiment 2 of the present document.

FIG. 5 is a method for registering an Anycast-RP multicast source according to the embodiment, a schematic diagram of the network deployment may refer to FIG. 2, RPs closest to an MN1, MN2 and MN3 are respectively RP1, RP2 and RP3, the RP1, RP2 and RP3 form an Anycast-RP Set, each router in the Anycast-RP Set is configured with the same Anycast-RP (RPA) address on a loopback interface, and is also configured with a local address unique in the whole network to interact with other routers within the Set. As shown in FIG. 5, the following steps are specifically included.

Step 501 to step 502 are identical with the step 401 to step 402, which will not be repeated here.

In step 503, an MAG1 sends an encapsulated registration message by means of anycast, a source address of the message is an address of the MAG1, and a target address of the message is an anycast address RPA of the Anycast-RP Set.

In step 504, after receiving the registration message, the RP1 closest to the MAG1 in topology forwards the registration message to other routers within the Anycast-RP Set, a source address of the message is set as a local address of the RP1, and a target address of the message is set as a local address of the RP2.

In step 505, the RP1 forwards the registration message to the RP3, a source address of the message is set as the local address of the RP1, and a target address of the message is set as a local address of the RP3.

It should be noted that there is no strict sequence for the step 504 and the step 505.

Through the method mentioned in the above embodiment 2, the RP1, RP2 and RP3 all perceive the existence of the multicast source MN1, and save the binding relationship between the home address of the MN1 and the proxy care-of address of the MN1, the RP2 and RP3 initiate an establishment of an SPT path to the multicast source MN1 based on this, and a specific method for establishing the SPT path and a method for forwarding the message may refer to the following embodiments.

Embodiment 3

Figure 6:
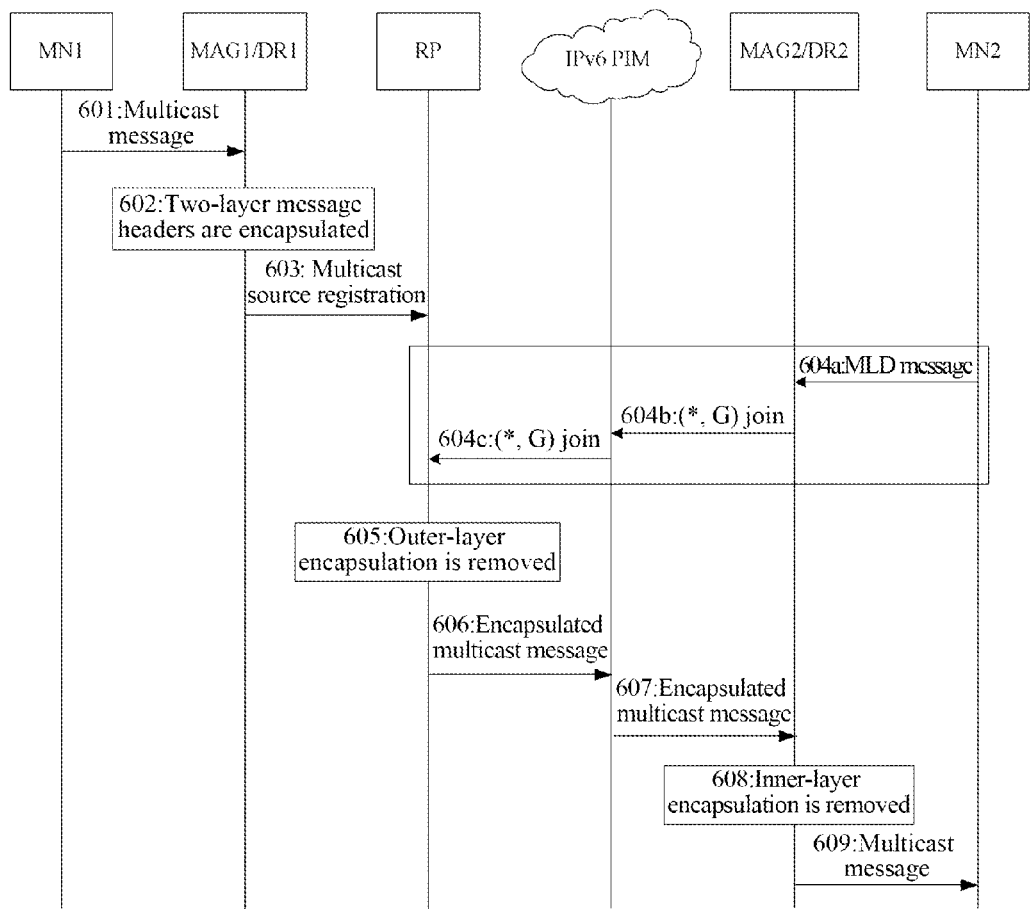
FIG. 6 is a flow chart of a method for forwarding a multicast message according to the embodiment 3 of the present document.

FIG. 6 is a method for forwarding a multicast message according to the embodiment, and PIM routers passed from an RP to an MAG2 are represented with an IPv6 PIM cloud picture. As shown in FIG. 6, the multicast forwarding specifically includes the following steps.

Step 601 to step 603, namely a registration process of the multicast source, are identical with the step 401 to step 403, which will not be repeated here.

In step 604a, an MN2 notifies a DR2 (i.e. an MAG2) directly connected to the MN2 to join the multicast group through an MLD message.

In step 604b to step 604c, the MAG2 sends a (*, G) join message in an RP direction corresponding to the multicast group, routers passed from the DR to the RP form an RPT branch, these routers all generate a (*, G) forwarding table entry, "*" represents that it is from any multicast source, G represents a multicast address, and the RPT takes the RP as a root and the DR as a leaf.

It should be noted that there is no strict sequence for the multicast source registration (i.e. step 601 to step 603) and the RPT establishment (i.e. step 604).

In step 605, after receiving a unicasted registration message from an MAG1, the RP removes an outer-layer unicast encapsulation.

The multicast message for which the outer-layer encapsulation is removed is also with an inner-layer multicast encapsulation, a source address of an inner-layer multicast header is the proxy care-of address S-pCoA of the MN1, namely the address of the MAG1, and a target address of an inner-layer multicast header is the multicast address G.

In step 606 to step 607, the RP sends the multicast message with the one-layer multicast encapsulation to a DR of the receiver side, namely the MAG2 to which the MN2 attaches, along the direction of the RPT.

In step 608, after receiving the multicast message with the one-layer multicast encapsulation, the MAG2 removes the multicast header, and restores the original multicast message (the source address is a home address S-HoA of the multicast source MN1, and the target address is a multicast address G of the multicast group).

In step 609, the MAG2 sends the multicast message for which the multicast encapsulation is removed to the receiver MN2.

Through the above embodiment, all multicast messages sent from the multicast source MN1 to the multicast group must be firstly added with one-layer multicast encapsulation by the multicast source side MAG1 and then encapsulated as registration messages to be sent to the RP, the RP removes the registration encapsulation and then distributes the registration messages to the MAG2 to which the MN2 attaches along the RPT, and finally the MAG2 removes the multicast encapsulation and then forwards the registration messages to the MN2, the RP is a transfer station which all the multicast data must go through. The PIM-SM allows the RP or the DR of the receiver side to initiate an SPT switching, and an SPT switching scheme of the present document may refer to the following embodiment 4.

Embodiment 4

Figure 7:
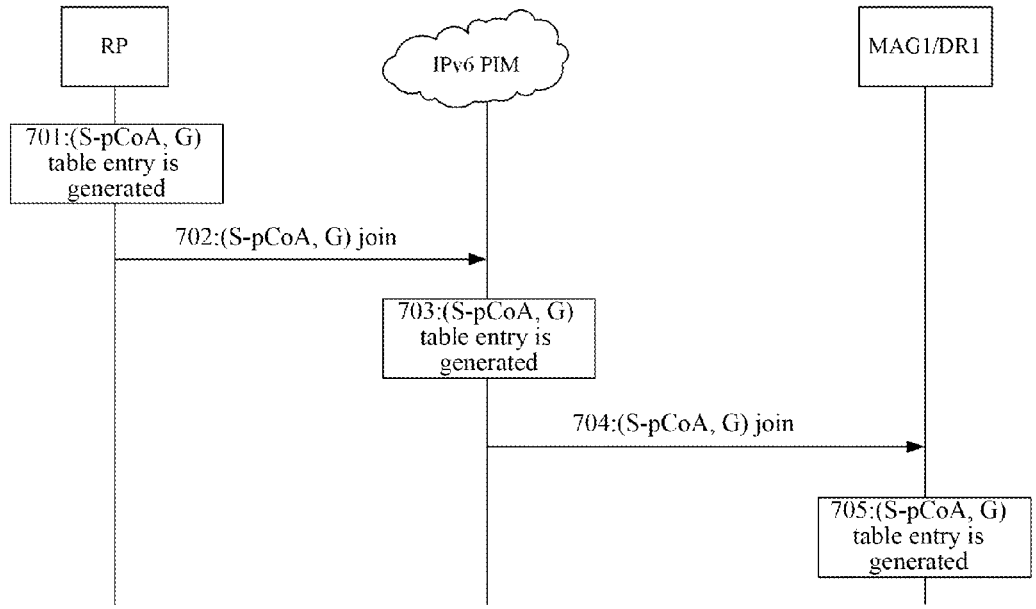
FIG. 7 is a flow chart of a method for establishing a multicast path according to the embodiment 4 of the present document.

FIG. 7 is a method for establishing a multicast path according to the embodiment, and routers passed from an RP to a multicast source MN1 are represented with an IPv6 PIM cloud picture. After completing the registration of the multicast source according to the methods of the embodiments 1 and 2, the RP can select to initiate an SPT switching, and as shown in FIG. 7, the following steps are specifically included.

In step 701 to step 705, after the RP receives a registration message from an MAG1, since a source address of a multicast header encapsulated in the registration message is a proxy care-of address S-pCoA of the MN1, from the perspective of the RP, an address of the currently registered multicast source is the S-pCoA. Hence the RP sends a (S-pCoA, G) join message to a direction of the multicast source, and the message eventually reaches a DR of the multicast source side (i.e. the MAG1), and all routers passed along the way generate a (S-pCoA, G) multicast forwarding table entry in their forwarding tables, thus an SPT branch is established between the MAG1 and the RP, and the subsequent multicast messages all directly reach the RP along the branch.

Through the above embodiment, the SPT branch is established between the MAG1 and the RP.

Embodiment 5

Figure 8:
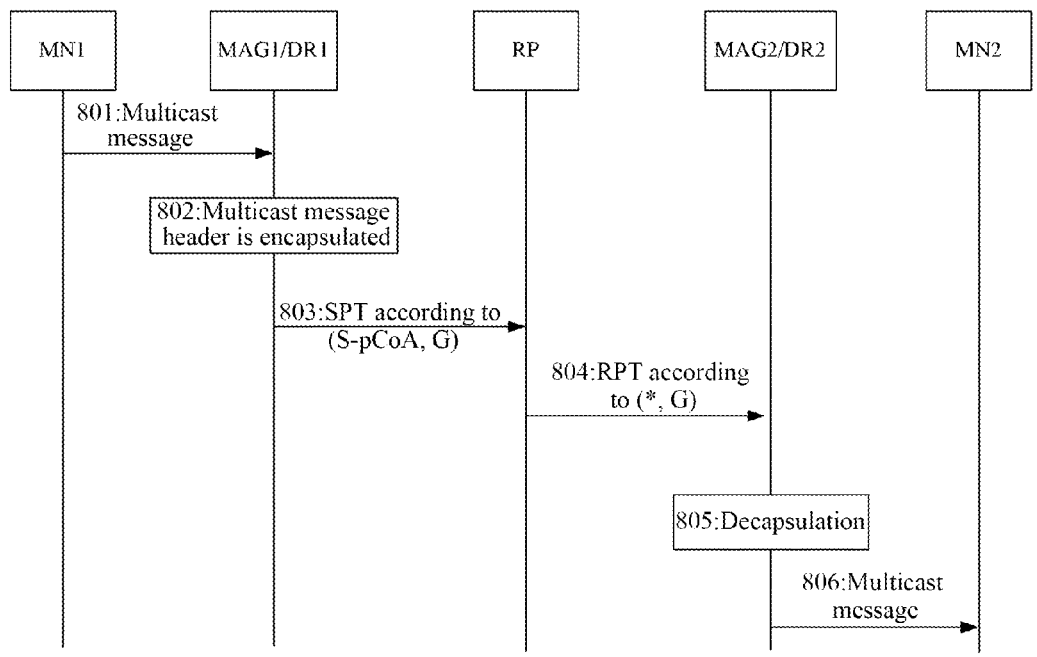
FIG. 8 is a flow chart of a method for forwarding a multicast message according to the embodiment 5 of the present document.

FIG. 8 is a method for forwarding a multicast message according to the embodiment, the method for forwarding the multicast message after an RP completes an SPT switching is as shown in FIG. 8, and the following steps are specifically included.

In step 801, a multicast source MN1 sends a multicast message to a multicast group, a target address of the message is a multicast address G of the multicast group, and a source address of the message is a home address S-HoA of the MN1.

In step 802, after receiving the multicast message, an MAG1 directly connected to the MN1 encapsulates another layer of multicast header, a target address of the multicast header is the multicast address G of the original multicast message, and a source address of the multicast header is set as a proxy care-of address S-pCoA of the MN1.

In step 803, the MAG1 forwards the encapsulated multicast message according to a (S-pCoA, G) multicast forwarding table entry, the message reaches an RP along an SPT path, and all routers passed along the path forward the message according to the (S-pCoA, G) multicast forwarding table entry.

In step 804, the RP forwards the encapsulated multicast message to an MAG2 along an RPT path, and all routers passed along the path forward the message according to a (*, G) forwarding table entry.

In step 805, after receiving the multicast message with the one-layer multicast encapsulation, the MAG2 removes the multicast encapsulation, and restores the original multicast message (the source address is the home address S-HoA of the multicast source MN1, and the target address is the multicast address G of the multicast group).

In step 806, the MAG2 sends the multicast message for which the multicast encapsulation is removed to a receiver MN2.

The embodiment 1 to embodiment 5 propose a method for establishing a multicast path and a method for forwarding a multicast message with respect to the ASM model, and a method for establishing a multicast path with respect to the SSM model may refer to the embodiment 6.

Embodiment 6

Figure 9:
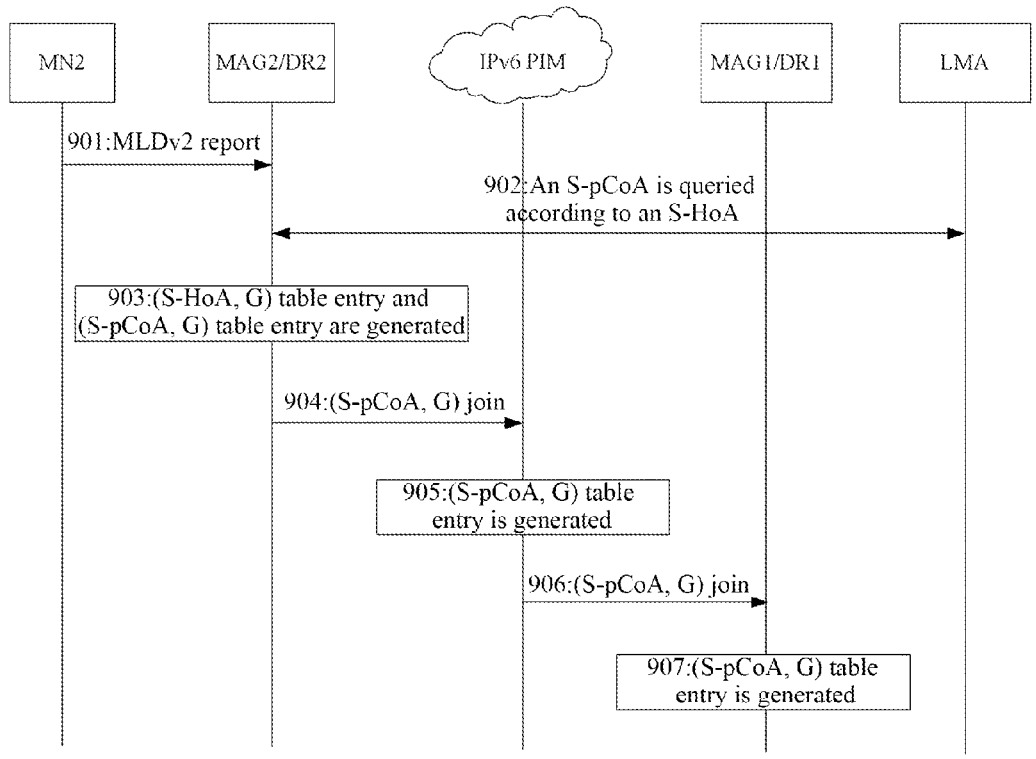
FIG. 9 is a flow chart of a method for establishing a multicast path in an SSM model according to the embodiment 6 of the present document.

FIG. 9 is a method for establishing a multicast path in the SSM model according to the embodiment, and the following steps are specifically included.

In step 901, an MN2 reports to an MAG2 with the help of MLDv2 that it is interested in information coming from a multicast source MN1 and sent to a multicast group, and applies for joining a channel (S-HoA, G), the S-HoA represents a home address of the multicast source MN1, and the G represents a multicast address.

In step 902, the MAG2 queries an LMA for a proxy care-of address S-pCoA of the MN1 according to the home address S-HoA of the multicast source MN1.

In step 903, the MAG2 simultaneously generates a (S-HoA, G) table entry and a (S-pCoA, G) table entry in its multicast forwarding table, which is specifically as follows:

the MAG2 masters receiver information of the channel (S-HoA, G) through an MLDv2 protocol, and generates the (S-HoA, G) table entry in its forwarding table, and an outgoing interface list is for interfaces for the MAG2 receiving a channel subscribe message; and the MAG2 generates the (S-pCoA, G) table entry in its forwarding table, and an outgoing interface list is copied from the outgoing interface list of the (S-HoA, G) table entry.

In step 904, the MAG2 sends a channel subscribe message hop by hop in a multicast source direction corresponding to a channel (S-pCoA, G).

In step 905 to step 906, all IPv6 PIM routers along the way send channel subscribe messages hop by hop to the multicast source detection corresponding to the channel (S-pCoA, G), and generate a (S-pCoA, G) table entry in their forwarding tables.

In step 907, after receiving the channel subscribe message from the upstream routers, an MAG1 generates a (S-pCoA, G) table entry in its forwarding table.

Through the above embodiment, an SPT branch is established between the MAG1 and the MAG2 according to the proxy care-of address of the multicast source.

Embodiment 7

Figure 10:
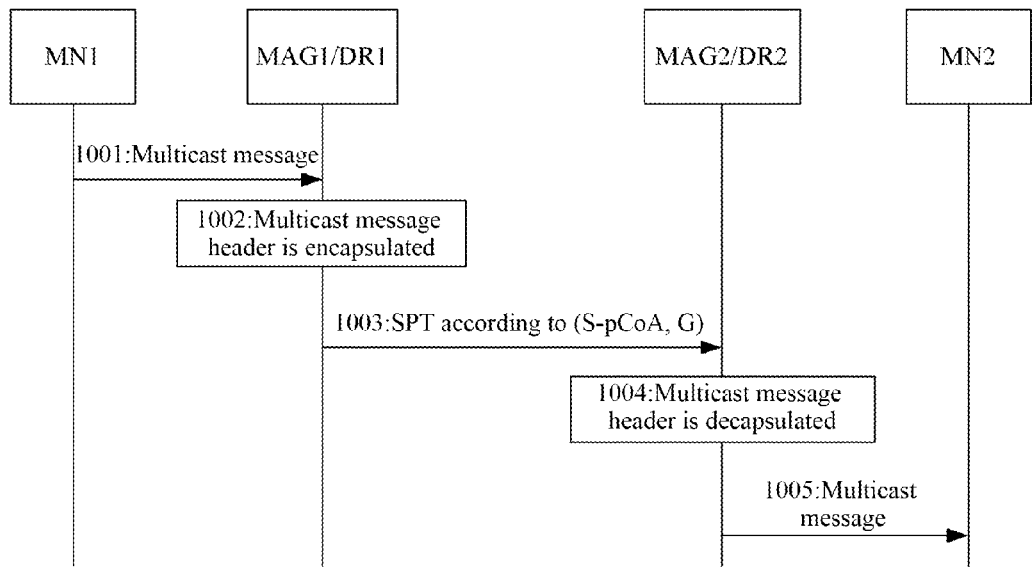
FIG. 10 is a flow chart of a method for forwarding a multicast message in an SSM model according to the embodiment 7 of the present document.

FIG. 10 is a method for forwarding a multicast message in the SSM model according to the embodiment, and the following steps are specifically included.

In step 1001, a multicast source MN1 sends a multicast message to a multicast group, a target address of the message is a multicast address G of the multicast group, and a source address of the message is a home address S-HoA of the MN1.

In step 1002, after receiving the multicast message, an MAG1 directly connected to the MN1 encapsulates another layer of multicast header, wherein a target address of the multicast header is the multicast address G of the original multicast message, and a source address of the multicast header is set as a proxy care-of address S-pCoA of the MN1; and then queries a (S-pCoA, G) multicast forwarding table entry, if an outgoing interface list is not null, forwards the encapsulated multicast message.

In step 1003, all routers passed along the way forward the encapsulated multicast message according to the (S-pCoA, G) multicast forwarding table entry, that is, forwarding along the SPT path established in the embodiment 6.

In step 1004, after receiving the multicast message with the one-layer multicast encapsulation, an MAG2 queries the (S-pCoA, G) multicast forwarding table entry to perform Reverse Path Forwarding (RPF) check, removes the multicast header after the check is passed, and restores the original multicast message (the source address is the home address S-HoA of the multicast source MN1, and the target address is the multicast address G of the multicast group).

In step 1005, the MAG2 queries a (S-HoA, G) forwarding table entry, and sends the original multicast message to a multicast listener MN2.

Figure 3:
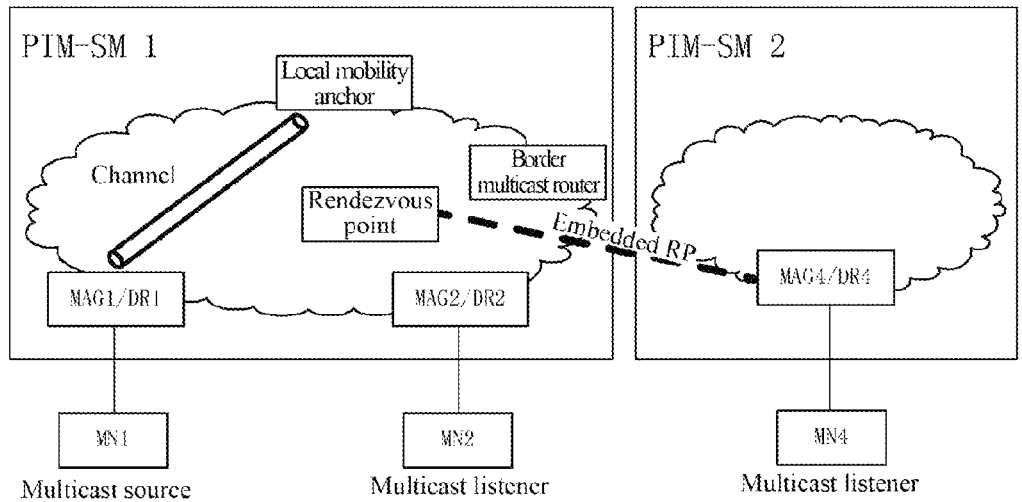
FIG. 3 is a schematic diagram of a scenario of inter-domain multicast in the PMIPv6 deployment in the related art.

As shown in FIG. 3, an MN4 is a multicast listener in another PIM-SM domain, interconnection is performed through the MBGP between domains, a DR directly connected to the MN4 can be an MAG or an ordinary multicast router, the MN4 can be a PMIPv6 node or an ordinary fixed node. Interconnection is performed through a Border Multicast Router (BMR) between two PIM domains, the BMR can be separately deployed or be jointly set with an LMA, the MN2 and MN4 are all required to intercept multicast data sent by the multicast source MN1. With regard to the ASM model, according to the methods provided in the embodiment 1 to the embodiment 4, the message sent from the RP to the leaf nodes (MAG2 and MAG4) is a multicast message with one-layer multicast encapsulation, the MAG2 executes the decapsulation and then forwards the multicast message to the MN2, if a router directly connected to the MN4 is an ordinary multicast router, it does not have a function of decapsulation, and in order to solve the problem, it may refer to the embodiment 8 and embodiment 9. With regard to the SSM model, if a DR4 cannot query the proxy care-of address of the multicast source MN1, the SPT path can only be established according to the home address of the MN1 in a PIM domain 2, and how to establish the SPT path according to the proxy care-of address of the MN1 in a PIM domain 1 in such scenario may refer to the embodiment 8, embodiment 10 and embodiment 11.

Embodiment 8

Figure 11:
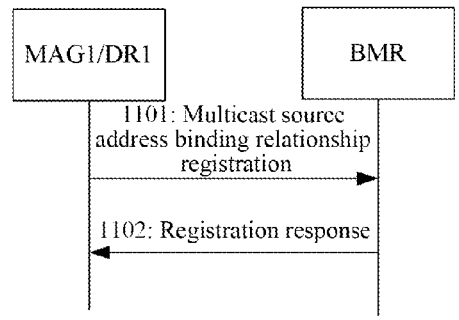
FIG. 11 is a flow chart of a method for registering a multicast source according to the embodiment 8 of the present document.

FIG. 11 is a method for a multicast source registering an address binding relationship to a BMR according to the embodiment, and the following steps are specifically included.

In step 1101, before a multicast source MN1 sends a multicast message to a multicast group, the MN1 firstly registers a binding relationship between a home address of the MN1 and a proxy care-of address of the MN1 to a BMR. An MAG1 directly connected to the MN1 sends an address binding registration request message to the BMR, the message contains information including the home address, proxy care-of address, security association and survival time and so on of the multicast source MN1. When the multicast source is moving, it is also required to register new address information to the BMR.

In step 1102, after receiving the binding registration request message of the MAG1, the BMR sends a binding registration response message to the MAG1, to indicate a successful registration.

It should be noted that, when the BMR and the LMA are jointly set, the above registration process can be omitted, and a binding cache entry (BCE) locally saved by the LMA is directly used.

Embodiment 9

Figure 12:
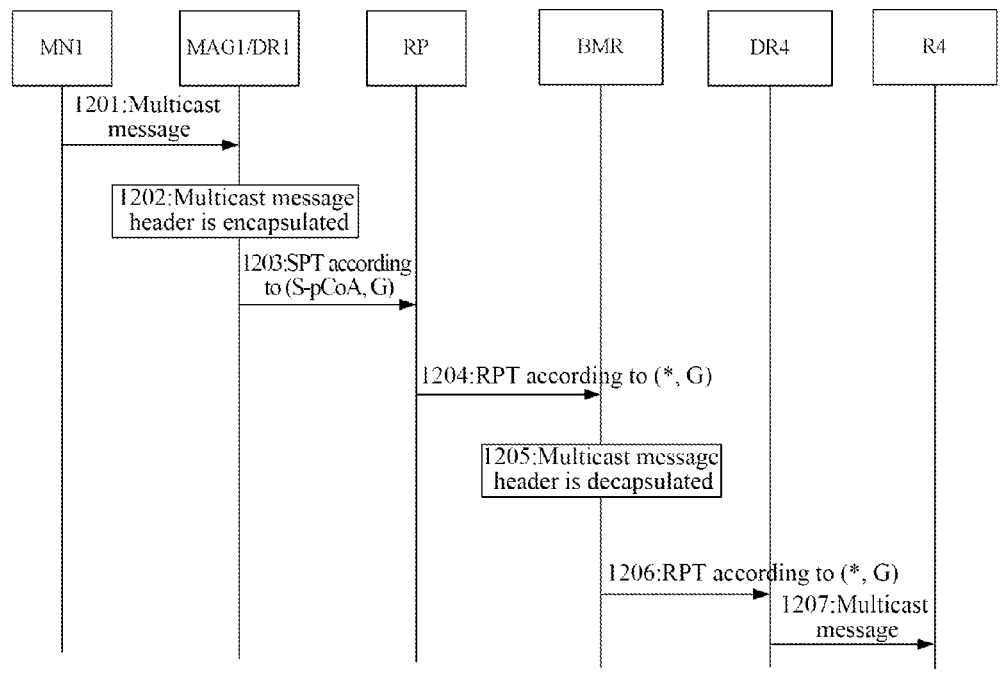
FIG. 12 is a flow chart of a method for forwarding a cross-domain multicast message in an ASM model according to the embodiment 9 of the present document.

FIG. 12 is a method for forwarding a cross-domain multicast message in the ASM model according to the embodiment, the multicast source registration and SPT establishment are completed according to the methods in the embodiment 1 to embodiment 3, and the RPT establishment is based on the related art. The method for forwarding the multicast message includes the following steps.

Step 1201 to step 1203 are identical with the step 801 to step 803, which will not be repeated here.

In step 1204, an RP forwards a multicast message along an RPT path, the multicast message is with one-layer multicast encapsulation, and all routers passed along the way forward the message according to a (*, G) forwarding table entry.

In step 1205, after receiving the multicast message with the multicast encapsulation, a BMR looks up a binding relationship according to a proxy care-of address of a multicast source MN1, judges that the multicast message is from the MN1 based on this, looks up the (*, G) multicast forwarding table entry, and judges that the multicast message is required to be forwarded towards outward of the domain according to outgoing interface information, and performs decapsulation on the multicast message.

In step 1206, the BMR forwards the decapsulated multicast message along the RPT path, the multicast message is the original multicast message sent by the MN1, and the multicast message is eventually routed to a DR4 directly connected to an MN4

In step 1207, the DR4 forwards the original multicast message to the listener MN4.

Embodiment 10

Figure 13:
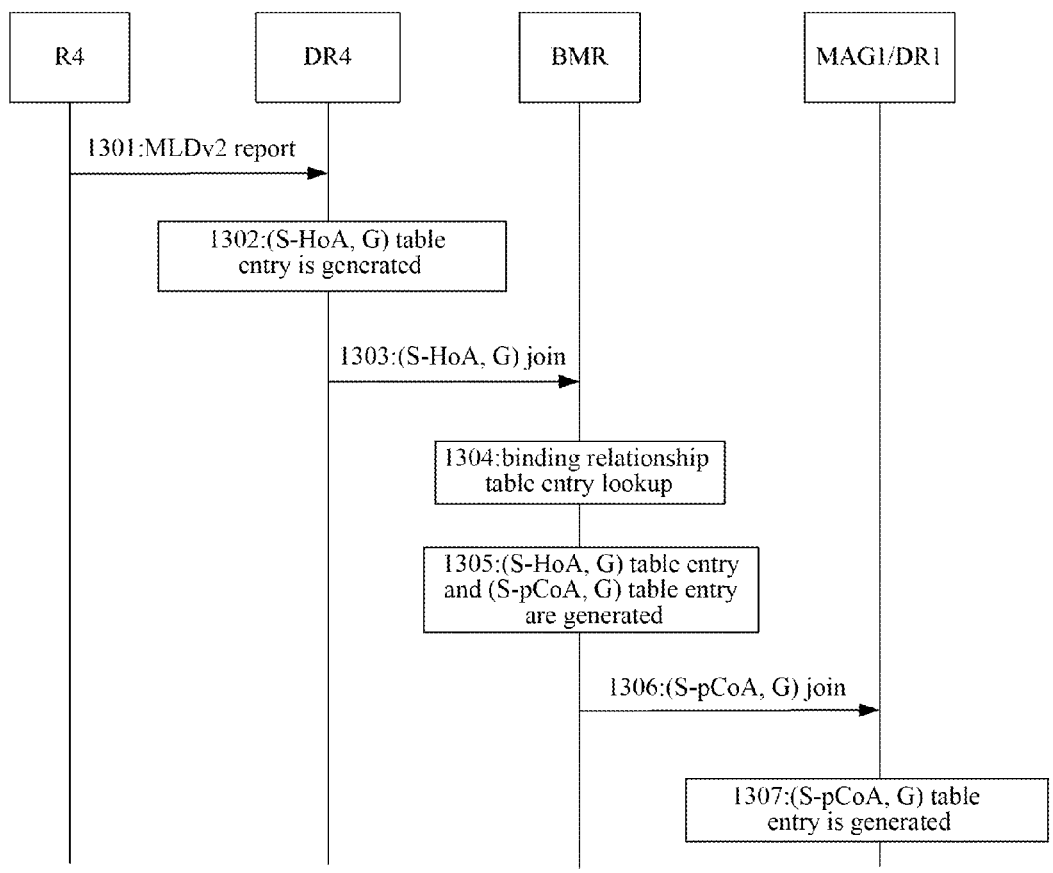
FIG. 13 is a flow chart of a method for establishing a cross-domain multicast path in an SSM model according to the embodiment 10 of the present document.

FIG. 13 is a method for establishing a cross-domain multicast path in the SSM model according to the embodiment, and the following steps are specifically included.

In step 1301, an MN4 reports to a DR4 with the help of MLDv2 that it is interested in information coming from a multicast source MN1 and sent to a multicast group, and applies for joining a channel (S-HoA, G), the S-HoA represents a home address of the multicast source MN1, and the G represents a multicast address.

In step 1302, the DR4 generates a (S-HoA, G) table entry in its multicast forwarding table.

In step 1303, the DR4 sends a channel subscribe message hop by hop in a multicast source direction corresponding to the channel (S-HoA, G), and routes the channel subscribe message to a BMR.

In step 1304, after receiving the subscribe message of the channel (S-HoA, G), the BMR looks up a binding relationship according to the S-HoA, and obtains a proxy care-of address corresponding to the home address S-HoA of the multicast source.

In step 1305, the BMR generates a (S-HoA, G) table entry and a (S-pCoA, G) table entry in its multicast forwarding table, which is specifically as follows:

the BMR generates the (S-HoA, G) table entry in its forwarding table according to the subscribe message of the channel (S-HoA, G), and an outgoing interface list is for interfaces for the BMR receiving the channel subscribe message; and the BMR generates the (S-pCoA, G) table entry in its forwarding table, and an outgoing interface list is copied from the outgoing interface list of the (S-HoA, G) table entry.

In step 1306, the BMR sends a channel subscribe message hop by hop in a multicast source direction corresponding to a channel (S-pCoA, G), all IPv6 PIM routers along the way generate a (S-pCoA, G) table entry in their forwarding tables, and the subscribe message is eventually routed to an MAG1.

In step 1307, after receiving the channel subscribe message from the upstream routers, the MAG1 generates a (S-pCoA, G) table entry in its forwarding table.

Embodiment 11

Figure 14:
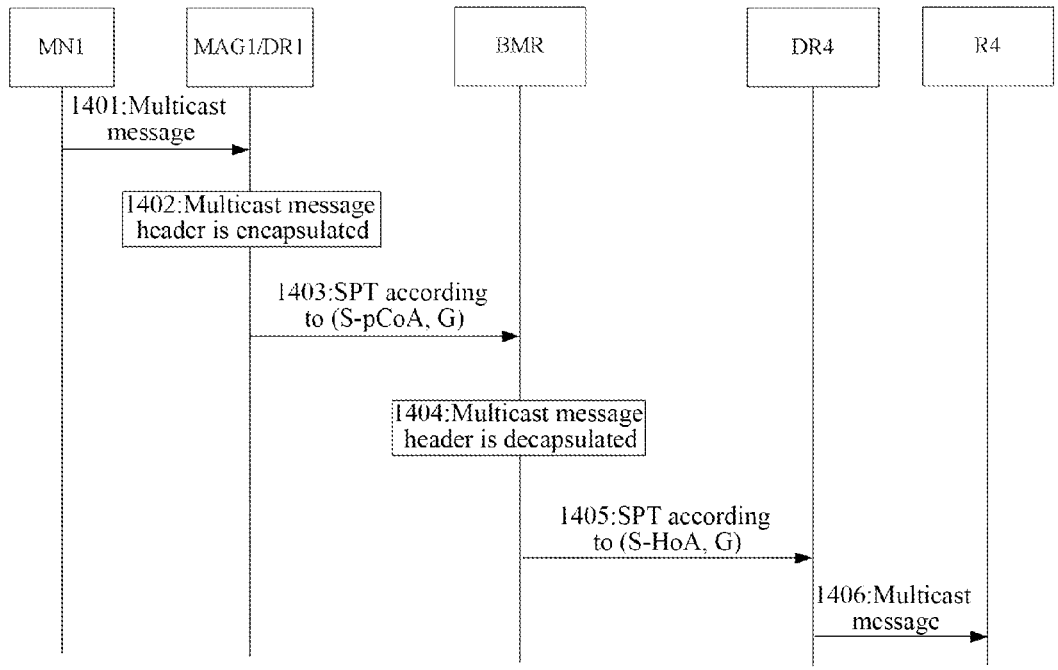
FIG. 14 is a flow chart of a method for forwarding a cross-domain multicast message in an SSM model according to the embodiment 11 of the present document.

FIG. 14 is a method for forwarding a cross-domain multicast message in the SSM model according to the embodiment, and the following steps are specifically included.

In step 1401, a multicast source MN1 sends a multicast message to a multicast group, a target address of the message is a multicast address G of the multicast group, and a source address of the message is a home address S-HoA of the MN1.

In step 1402, after receiving the multicast message, an MAG1 directly connected to the MN1 encapsulates another layer of multicast header, a target address of the multicast header is the multicast address G of the original multicast message, and a source address of the multicast header is set as a proxy care-of address S-pCoA of the MN1.

In step 1403, the MAG1 forwards the encapsulated multicast message according to a (S-pCoA, G) multicast forwarding table entry, the message reaches a BMR along an SPT path, and all routers passed along the path forward the message according to the (S-pCoA, G) multicast forwarding table entry.

In step 1404, after receiving the multicast message with the multicast encapsulation header, the BMR performs the following processing:

querying the (S-pCoA, G) multicast forwarding table entry to perform RPF check, removing the multicast header after the check is passed, and restoring the original multicast message.

In step 1405, the BMR queries a (S-HoA, G) multicast forwarding table entry, forwards the decapsulated multicast message according to an outgoing interface list, the multicast message reaches a DR4 along an SPT path, and all routers passed along the path forward the multicast message according to the (S-HoA, G) multicast forwarding table entry.

In step 1406, the DR4 forwards the original multicast message to an MN4.

It should be noted that, if the BMR and the LMA are jointly set, the LMA queries a local BCE to obtain the proxy care-of address of the multicast source.

Embodiment 12

Figure 15:
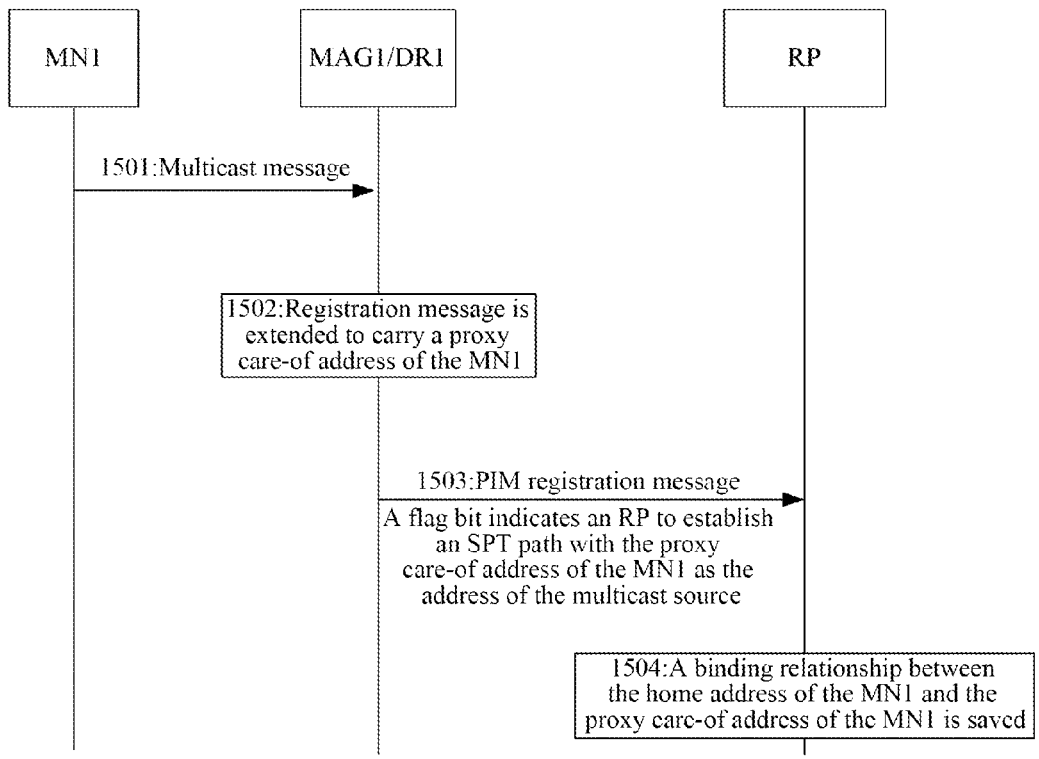
FIG. 15 is a flow chart of a method for registering a multicast source according to the embodiment 12 of the present document.

FIG. 15 is a method for registering a multicast source according to the embodiment, an MN1 is a multicast source attaching to an MAG1, the MAG1 servers as a DR of the MN1. As shown in FIG. 15, the following steps are specifically included.

In step 1501, a multicast source MN1 sends a multicast message to a multicast group G, a target address of the message is a multicast address G of the multicast group, and a source address of the message is a home address S-HoA of the MN1.

In step 1502, after receiving the multicast message, an MAG1 directly connected to the MN1 encapsulates the multicast message as a registration message, and carries address information of the multicast source MN1 by extending the registration message, the address information contains a proxy care-of address of the multicast source and a path establishment flag bit and so on, the path establishment flag bit is used for indicating an RP to establish an SPT path according to the proxy care-of address.

In step 1503, the MAG1 sends the extended registration message to the RP by means of unicast, a source address is an address of the MAG1, and a target address is an address of the RP.

In step 1504, after receiving the registration message, according to the address information of the MN1 carried in the message, the RP saves a binding relationship between the home address of the MN1 and the proxy care-of address of the MN1.

It should be noted that, the address information related to the multicast source carried in the registration message is not limited to the information given in the embodiment, address information besides the proxy care-of address of the multicast source also can be carried, such as address information of other routers, which is used for appointing routers by which the SPT path needs to go.

Embodiment 13

Figure 16:
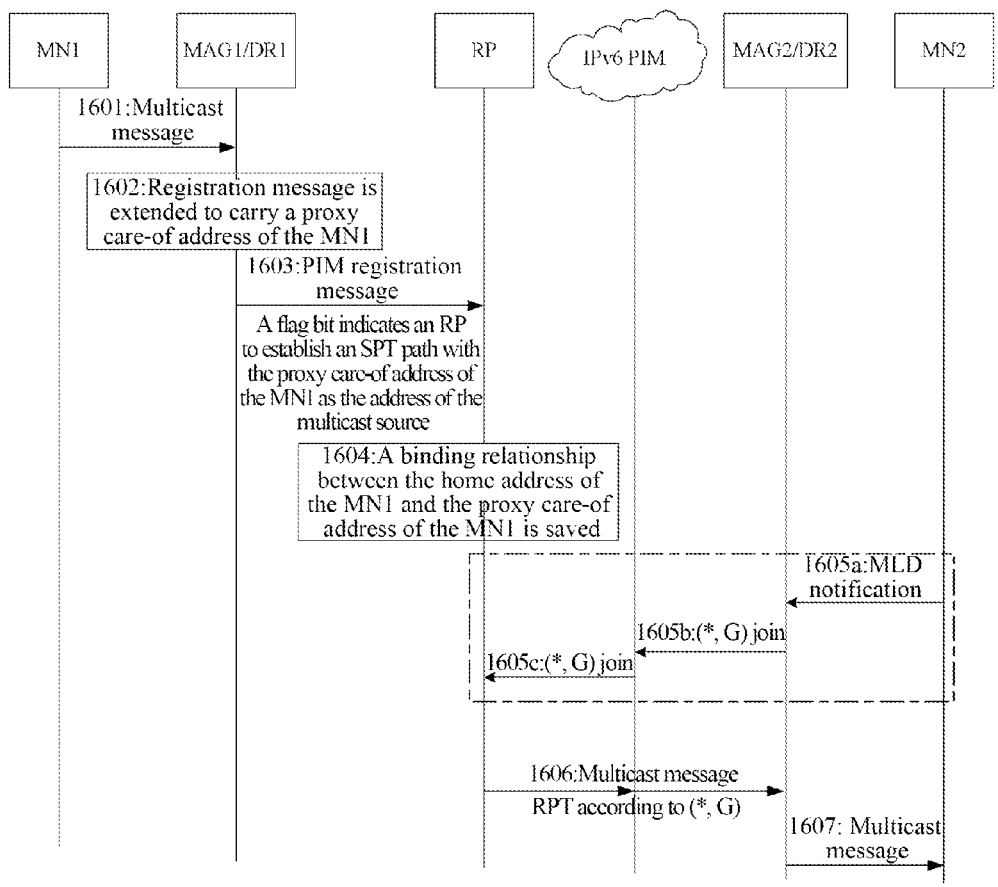
FIG. 16 is a flow chart of a method for forwarding a multicast message according to the embodiment 13 of the present document.

FIG. 16 is a method for forwarding a multicast message according to the embodiment, and PIM routers passed from an RP to an MAG2 are represented with an IPv6 PIM cloud picture. As shown in FIG. 16, the multicast forwarding specifically includes the following steps.

Step 1601 to step 1604, namely a registration process of the multicast source, are identical with the step 1501 to step 1504, which will not be repeated here.

In step 1605*a*, an MN2 notifies a DR2 (i.e. an MAG2) directly connected to the MN2 to join the multicast group through an MLD message.

In step 1605*b* to step 1605*c*, the MAG2 sends a (*, G) join message hop by hop in an RP direction corresponding to the multicast group, routers passed from the DR to the RP form an RPT branch, these routers all generate a (*, G) forwarding table entry, "*" represents that it is from any multicast source. The RPT takes the RP as a root and the DR as a leaf.

It should be noted that there is no strict sequence for the multicast source registration (i.e. step 1601 to step 1604) and the RPT establishment (i.e. step 1605).

In step 1606, after receiving a unicasted registration message from an MAG1, the RP removes the registration encapsulation and then sends the multicast message hop by hop to the MAG2 along the RPT direction.

In step 1607, the MAG2 sends the multicast message to the receiver MN2.

Embodiment 14

Figure 17:
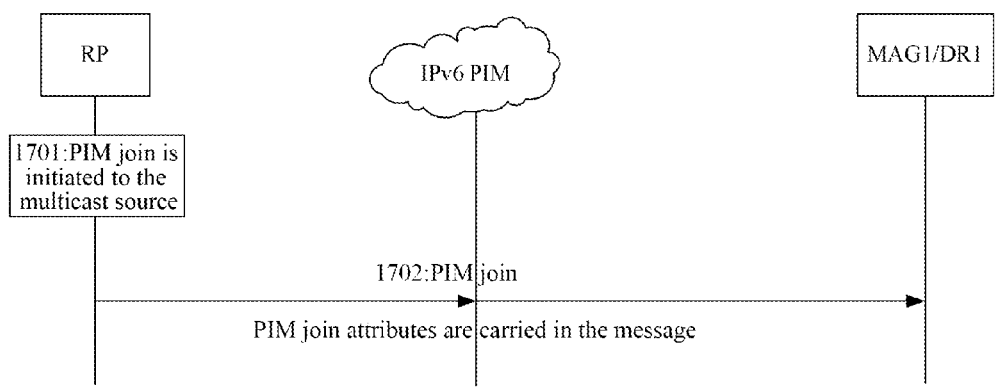
FIG. 17 is a flow chart of a method for establishing a multicast path according to the embodiment 14 of the present document.

FIG. 17 is a method for establishing a multicast path according to the embodiment, and routers passed from an RP to a multicast source MN1 are represented with an IPv6 PIM cloud picture. The following steps are specifically included.

In step 1701, after an RP receives a registration message of an MAG2, on one hand, it decapsulates the registration message and forwards the multicast message encapsulated in the registration message to a receiver along an RPT, on the other hand, it sends a join message with PIM Join Attributes hop by hop in a multicast source direction, the PIM join attribute is set as a proxy care-of address S-pCoA of the multicast source carried in the registration message. The RP determines an outgoing interface for sending the join message and a next hop according to the routing of the address S-pCoA.

In step 1702, the RP sends the join message hop by hop to an MAG1, all routers passed along the way perform RPF check according to the address S-pCoA in the PIM join attribute, thus an SPT branch is established between the MAG1 and the RP according to the address S-pCoA, and the subsequent multicast messages all directly reach the RP along the branch.

Embodiment 15

Figure 18:
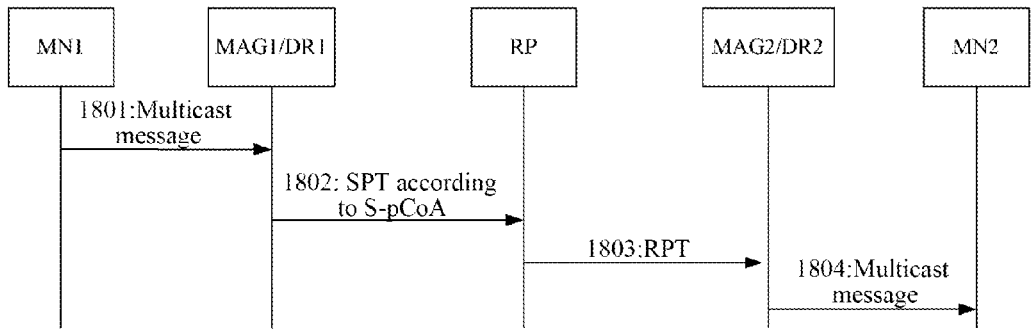
FIG. 18 is a flow chart of a method for forwarding a multicast message according to the embodiment 15 of the present document.

FIG. 18 is a method for forwarding a multicast message according to the embodiment, the method for forwarding the multicast message after an RP completes an SPT switching is as shown in FIG. 18, and the following steps are specifically included.

In step 1801, a multicast source MN1 sends a multicast message to a multicast group, a target address of the message is a multicast address G of the multicast group, and a source address of the message is a home address S-HoA of the MN1.

In step 1802, after receiving the multicast message, an MAG1 directly connected to the MN1 forwards the multicast message to an RP along the SPT path established in the embodiment 14.

In step 1803, after receiving the multicast message, the RP forwards the multicast message to an MAG2 along an RPT path.

In step 1804, the MAG2 sends the multicast message to a receiver MN2.

Embodiment 16

Figure 19:
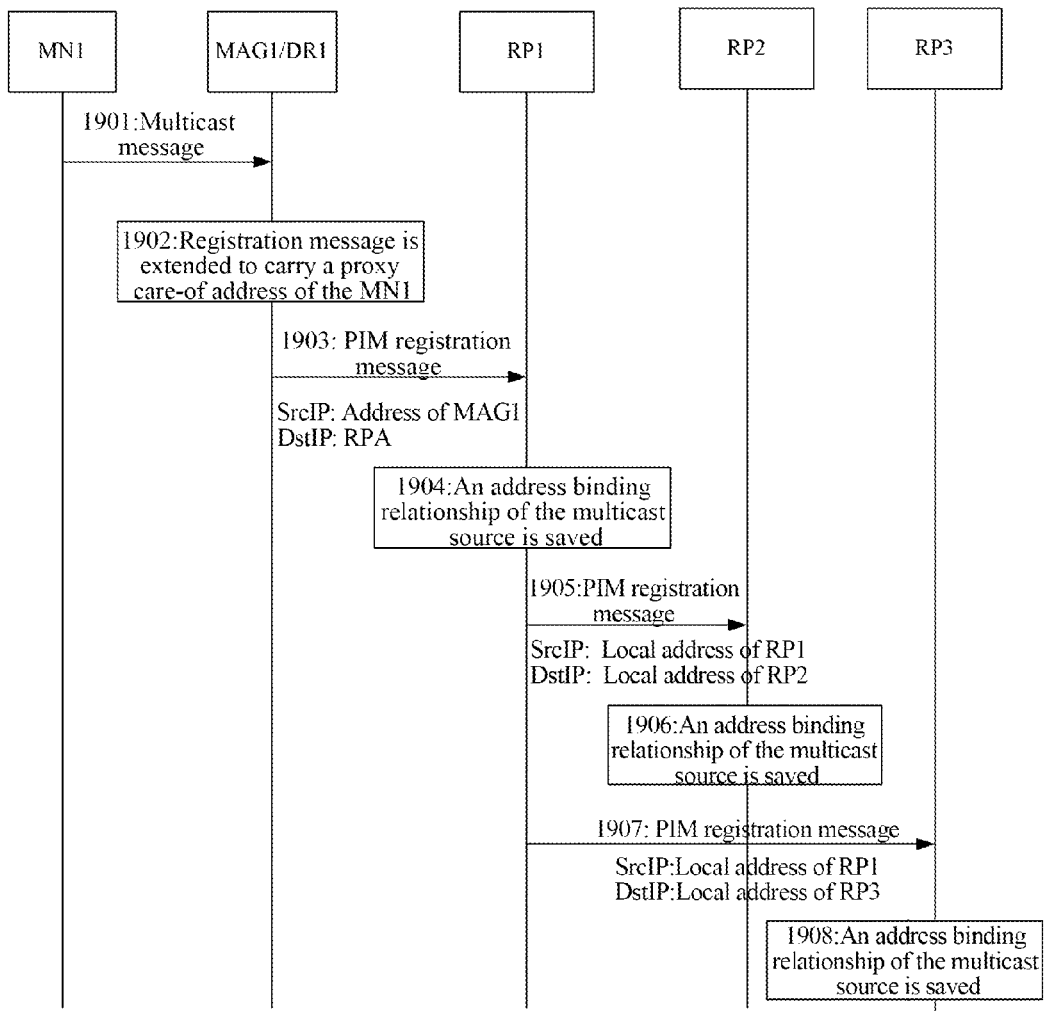
FIG. 19 is a flow chart of a method for registering an Anycast-RP multicast source according to the embodiment 16 of the present document.

FIG. 19 is a method for registering an Anycast-RP multicast source according to the embodiment, a schematic diagram of the network deployment may refer to FIG. 2, RPs closest to an MN1, MN2 and MN3 are respectively RP1, RP2 and RP3, the RP1, RP2 and RP3 form an Anycast-RP Set, each router in the Anycast-RP Set is configured with the same Anycast-RP (RPA) address on a loopback interface, and is also configured with a local address unique in the whole network to interact with other routers within the Set. As shown in FIG. 19, the following steps are specifically included.

Step 1901 and step 1902 are identical with the step 1501 and step 1502, which will not be repeated here.

In step 1903, an MAG1 sends an extended registration message by means of anycast, a source address of the message is an address of the MAG1, and a target address of the message is an anycast address RPA of the Anycast-RP Set.

In step 1904, after receiving the registration message, the RP1 closest to the MAG1 in topology performs the following processing:

according to the address information of the MN1 carried in the message, saving a binding relationship between the home address of the MN1 and the proxy care-of address of the MN1; and forwarding the registration message to other routers within the Anycast-RP Set.

In step 1905, the RP1 forwards the registration message to the RP2, a source address of the message is set as a local address of the RP1, and a target address of the message is set as a local address of the RP2.

In step 1906, after receiving the registration message forwarded from the RP1, the RP2 performs the following processing:

according to the address information of the MN1 carried in the message, saving a binding relationship between the home address of the MN1 and the proxy care-of address of the MN1; and forwarding the multicast message encapsulated in the registration message to the receiver MN2 along an RPT.

In step 1907, the RP1 forwards the registration message to the RP3, a source address of the message is set as the local address of the RP1, and a target address of the message is set as a local address of the RP3.

In step 1908, after receiving the registration message forwarded from the RP1, the RP3 performs the following processing:

according to the address information of the MN1 carried in the message, saving a binding relationship between the home address of the MN1 and the proxy care-of address of the MN1; and forwarding the multicast message encapsulated in the registration message to the receiver MN3 along an RPT.

It should be noted that there is no strict sequence for the step 1905 to step 1906 and the step 1907 to step 1908.

Through the method mentioned in the above embodiment 16, the RP1, RP2 and RP3 all perceive the existence of the multicast source MN1, and save the binding relationship between the home address of the MN1 and the proxy care-of address of the MN1, the RP2 and RP3 initiate an establishment of an SPT path to the multicast source MN1 based on this, and a specific method for establishing the SPT path and a method for forwarding the message may refer to the methods provided in the embodiment 13, embodiment 14 and embodiment 15.

It should be noted that the methods provided in the embodiment 12 to embodiment 16 are also applicable to a cross-domain scenario, since it is not required to modify the embedded RP mechanism, it will not be repeated here.

Embodiment 17

Figure 20:
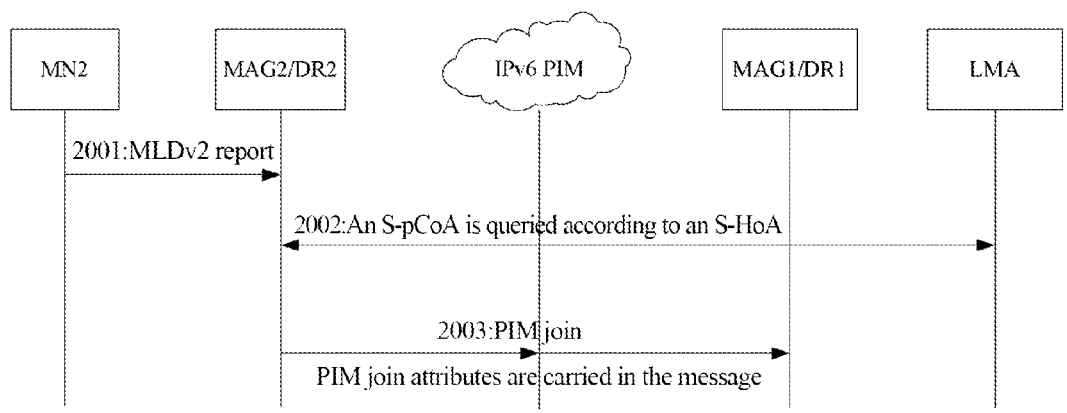
FIG. 20 is a flow chart of a method for establishing a multicast path in an SSM model according to the embodiment 17 of the present document.

FIG. 20 is a method for establishing a multicast path in the SSM model according to the embodiment, and the following steps are specifically included.

In step 2001, an MN2 reports to an MAG2 with the help of MLDv2 that it is interested in information coming from a multicast source MN1 and sent to a multicast group, and applies for joining a channel (S-HoA, G), the S-HoA represents a home address of the multicast source MN1, and the G represents a multicast address.

In step 2002, the MAG2 queries to an LMA for a proxy care-of address S-pCoA of the MN1 according to the home address S-HoA of the multicast source MN1.

In step 2003, the MAG2 sends a join message with PIM Join Attributes hop by hop in a multicast source direction, and the proxy care-of address S-pCoA of the multicast source is carried in the PIM join attribute. All routers passed along the way perform RPF check according to the S-pCoA, thus an SPT branch is established between the MAG2 and the MAG1 according to the address S-pCoA, and the subsequent multicast messages all directly reach the MAG2 along the branch.

Embodiment 18

Figure 21:
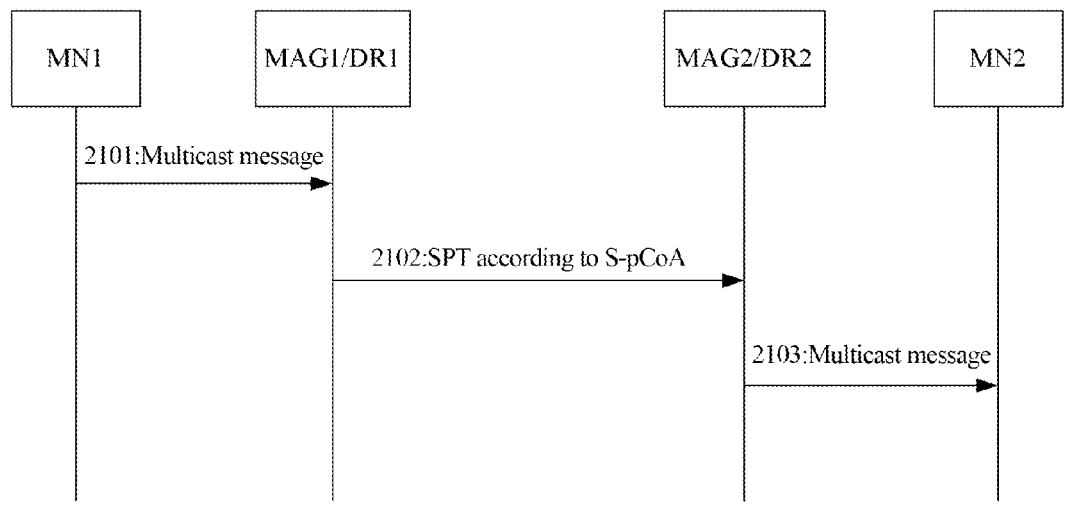
FIG. 21 is a flow chart of a method for forwarding a multicast message in an SSM model according to the embodiment 18 of the present document.

FIG. 21 is a method for forwarding a multicast message in the SSM model according to the embodiment, and the following steps are specifically included.

In step 2101, a multicast source MN1 sends a multicast message to a multicast group G, a target address of the message is a multicast address G of the multicast group, and a source address of the message is a home address S-HoA of the MN1.

In step 2102, after receiving the multicast message, an MAG1 directly connected to the MN1 forwards the multicast message to an MAG2 along the SPT path established in the embodiment 17, and all routers passed along the path perform RPF check according to the S-pCoA.

In step 2103, the MAG2 sends the multicast message to a receiver MN2.

Embodiment 19

Figure 22:
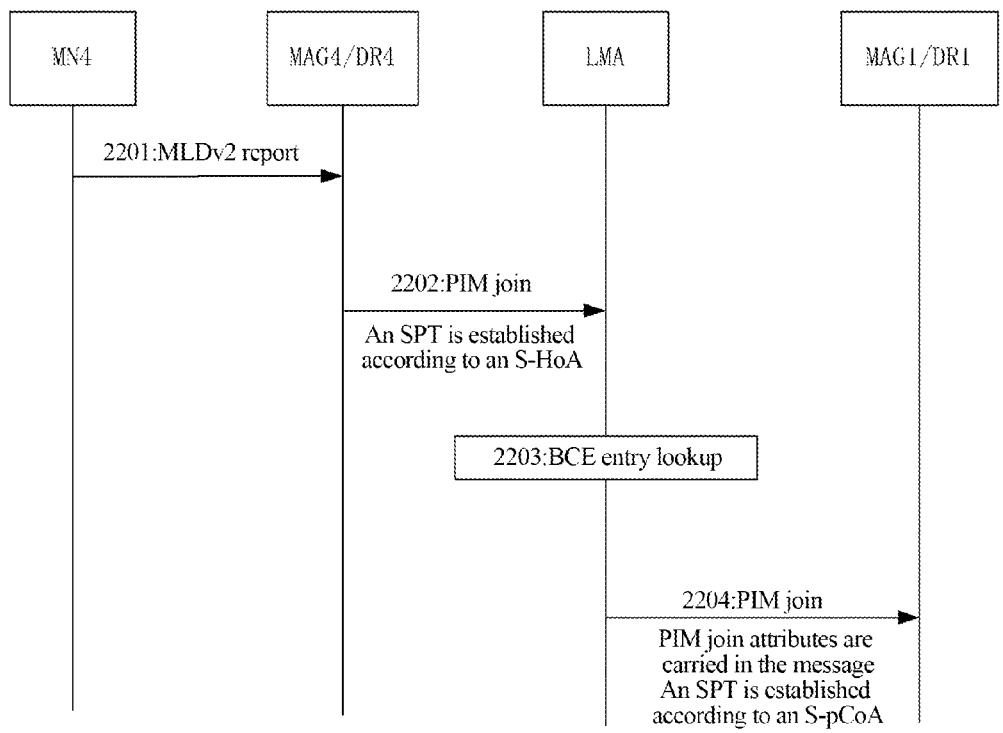
FIG. 22 is a flow chart of a method for establishing a cross-domain multicast path in an SSM model according to the embodiment 19 of the present document.

As shown in FIG. 3, an MN4 is a multicast listener in another PIM-SM domain, interconnection is performed through the MBGP between domains, a DR multicast router directly connected to the MN4 can be an MAG or an ordinary multicast router, the MN4 can be a PMIPv6 node or an ordinary fixed node. When the router directly connected to the MN4 can query a proxy care-of address of the multicast source, an SPT path is established and message forwarding is performed according to the methods of the embodiment 6 and embodiment 7, otherwise, when the router directly connected to the MN4 cannot acquire the proxy care-of address of the multicast source, an SPT path is established according to the method provided in the current embodiment 19, FIG. 22 is a method for establishing a cross-domain SPT path in the SSM model according to the embodiment 19 of the present document, and the following steps are specifically included.

In step 2201, an MN4 reports to a DR4 with the help of MLDv2 that it is interested in information coming from a multicast source MN1 and sent to a multicast group, and applies for joining a channel (S-HoA, G), the S-HoA represents a home address of the multicast source MN1, and the G represents a multicast address.

In step 2202, the DR4 sends a channel subscribe message hop by hop to the channel (S-HoA, G), and according to the policy routing of the PMIPv6, the subscribe message of the channel (S-HoA, G) is sent to an LMA hop by hop, and all routers passed along the way establish an SPT path according to the address S-HoA.

In step 2203, the LMA looks up a local binding cache entry BCE according to the S-HoA, and obtains a proxy care-of address S-pCoA corresponding to the home address S-HoA of the multicast source.

In step 2204, the LMA modifies the channel subscribe message, and carries PIM Join Attributes in the subscribe message, the proxy care-of address S-pCoA of the multicast source is carried in the PIM join attributes. The LMA sends the subscribe message with the PIM join attributes hop by hop in a multicast source direction, all routers passed along the way perform RPF check according to the S-pCoA, and thus an SPT path based on the address S-pCoA is established between the LMA and the MAG1.

Embodiment 20

Figure 23:
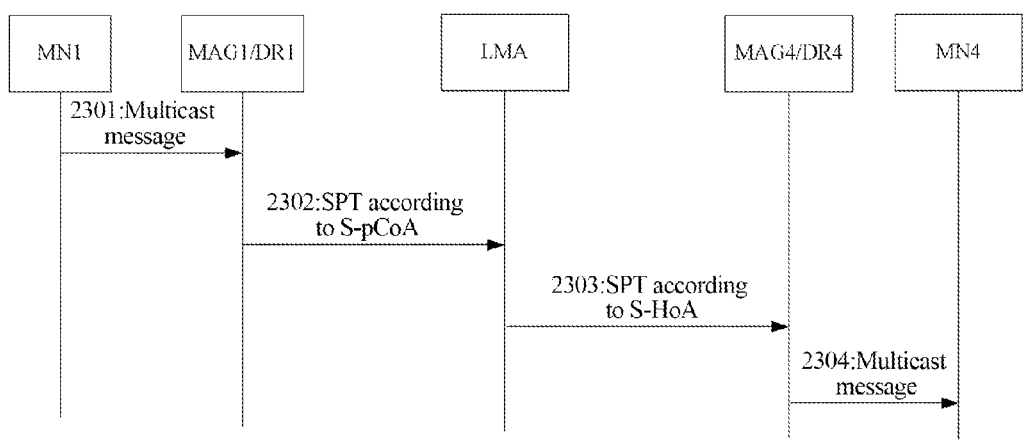
FIG. 23 is a flow chart of a method for forwarding a cross-domain multicast message in an SSM model according to the embodiment 20 of the present document.

FIG. 23 is a method for forwarding a cross-domain multicast message in the SSM model according to the embodiment, and the following steps are specifically included.

In step 2301, a multicast source MN1 sends a multicast message to a multicast group, a target address of the message is a multicast address G of the multicast group, and a source address of the message is a home address S-HoA of the MN1.

In step 2302, after receiving the multicast message, an MAG1 directly connected to the MN1 forwards the multicast message to an LMA along the SPT path established in the embodiment 19, and all routers passed along the path perform RPF check according to an S-pCoA and forward the multicast message.

In step 2303, the LMA continues to forward the multicast message to a DR4 along the SPT path established in the embodiment 19, and all routers passed along the path perform RPF check according to the S-HoA and forward the multicast message.

In step 2304, the DR4 forwards the multicast message to an MN4.

It should be noted that, it is assumed that a zone border router for interconnecting the PIM SM 1 and the PIM SM 2 is the LMA in the embodiment 8 and embodiment 9, the actual deployment also can be to appoint an ordinary multicast router as the zone border router, at this point, the embodiment 19 and embodiment 20 are also applicable to the deployment scenario, but it is required to maintain an address binding relationship of the multicast source on the multicast router.

In the embodiment, with respect to the PMIPv6 scenario, a method for establishing an SPT path based on the proxy care-of address is provided. The technical scheme in the present document is also applicable to a scenario of proxy mobile IPv4, which can be implemented by the skilled in the art according to the technical scheme in the embodiments of the present document in combination with the existing technical scheme in the art.

Figure 24:
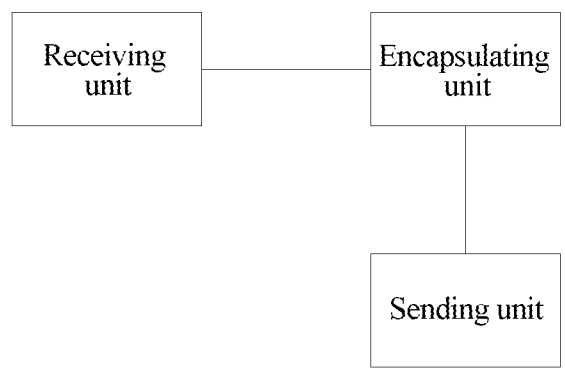
FIG. 24 is an architecture chart of a device for registering a multicast source according to the embodiment of the present document.

As shown in FIG. 24, the embodiment also provides a device for registering a multicast source, which includes: a receiving unit, an encapsulating unit and a sending unit, wherein:

the receiving unit is used to: receive a multicast message of the multicast source;

the encapsulating unit is used to: encapsulate a multicast header for the multicast message, wherein a target address of the multicast header is a multicast address, and a source address of the multicast header is a proxy care-of address of the multicast source; and after encapsulating the multicast header for the multicast message, encapsulate the multicast message as a registration message; and the sending unit is used to: send the registration message to a rendezvous point.

The proxy care-of address of the multicast source is an address of a mobile access gateway MAG to which the multicast source belongs.

The sending unit is specifically used to: send the registration message to the rendezvous point by means of unicast, wherein a source address in an outer-layer encapsulation of the registration message is the address of the MAG, and a target address in an outer-layer encapsulation of the registration message is an address of the rendezvous point; or send the registration message by means of anycast, wherein a source address in an outer-layer encapsulation of the registration message is the address of the MAG to which the multicast source belongs, and a target address in an outer-layer encapsulation of the registration message is an anycast address of a anycast-rendezvous point set.

The embodiment also provides a device for forwarding a multicast message, which includes: a receiving unit, a decapsulating unit and a sending unit, wherein:

the receiving unit is used to: receive a multicast message sent by a rendezvous point;

the decapsulating unit is used to: remove a multicast header of the multicast message, and obtain an original multicast message, wherein, a target address of the multicast header is a multicast address, and a source address of the multicast header is a proxy care-of address of a multicast source; and the sending unit is used to: send the original multicast message to a multicast listener.

Figure 25:
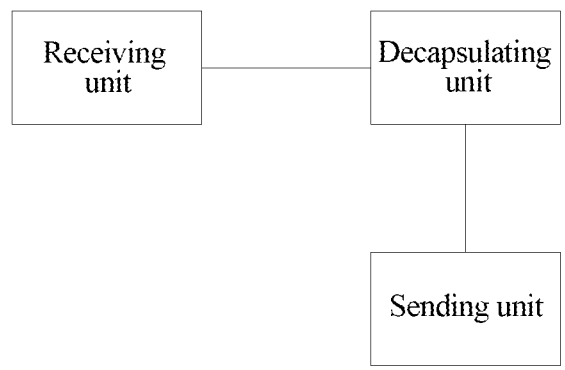
FIG. 25 is an architecture chart of a device for establishing a multicast path according to the embodiment of the present document.

As shown in FIG. 25, the embodiment also provides a device for establishing a multicast path, which includes: a receiving unit, a decapsulating unit and a sending unit, wherein:

the receiving unit is used to: receive a registration message sent by a designated router DR to which a multicast source belongs;

the decapsulating unit is used to: remove an outer-layer encapsulation of the registration message, and obtain a multicast header of an inner layer, wherein a source address of the multicast header is a proxy care-of address S-pCoA of the multicast source, and a target address of the multicast header is a multicast address G; and the sending unit is used to: send a join message to the DR to which the multicast source belongs, and establish a shortest path tree SPT branch between with the DR to which the multicast source belongs, wherein, routers passed along the SPT branch generate a (S-pCoA, G) multicast forwarding table entry.

The DR to which the multicast source belongs is a mobile access gateway MAG to which the multicast source belongs, and the proxy care-of address of the multicast source is an address of the MAG to which the multicast source belongs.

Another device for forwarding a multicast message provided in the embodiment includes: a receiving unit, an encapsulating unit and a sending unit, wherein:

the receiving unit is used to: receive a multicast message sent by a multicast source;

the encapsulating unit is used to: encapsulate a multicast header for the multicast message, wherein a target address of the multicast header is a multicast address G, and a source address of the multicast header is a proxy care-of address S-pCoA of the multicast source; and the sending unit is used to: forward a multicast message for which the multicast header is encapsulated according to a generated (S-pCoA, G) multicast forwarding table entry, wherein, the multicast message reaches a rendezvous point along a shortest path tree SPT branch, and all routers passed along the SPT branch forward the multicast message for which the multicast header is encapsulated according to the generated (S-pCoA, G) multicast forwarding table entry.

Another device for establishing a multicast path provided in the embodiment includes: a receiving unit, a table entry generating unit and a sending unit, wherein:

the receiving unit is used to: receive a message of applying for joining a channel sent by a multicast listener;

the table entry generating unit is used to: query a local mobility anchor LMA to obtain a proxy care-of address S-pCoA of a multicast source, and generate a (S-pCoA, multicast address G) multicast forwarding table entry; and the sending unit is used to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry.

Another device for forwarding a multicast message provided in the embodiment includes: a receiving unit, an encapsulating unit and a sending unit, wherein:

the receiving unit is used to: receive a multicast message of a multicast source;

the encapsulating unit is used to: encapsulate a multicast header for the multicast message, wherein a target address of the multicast header is a multicast address G, and a source address of the multicast header is a proxy care-of address S-pCoA of the multicast source; and the sending unit is used to: according to a generated (S-pCoA, G) multicast forwarding table entry, through a shortest path tree SPT branch between with a designated router DR to which a multicast listener belongs, forward a multicast message for which the multicast header is encapsulated to the DR to which the multicast listener belongs.

Another device for forwarding a multicast message provided in the embodiment includes: a receiving unit, a decapsulating unit and a sending unit, wherein:

the receiving unit is used to: receive a multicast message;

the decapsulating unit is used to: query a generated (S-pCoA, G) multicast forwarding table entry to perform reverse path forwarding RPF check, after the check is passed, remove a multicast header of the multicast message, and obtain an original multicast message; and the sending unit is used to: according to the generated (home address S-HoA of multicast source, G) forwarding table entry, send the original multicast message to a multicast listener.

Another device for registering a multicast source provided in the embodiment includes: a registration unit, wherein:

the registration unit is used to: register a binding relationship between a home address of the multicast source and a proxy care-of address of the multicast source to a border multicast router BMR, and complete a registration of the binding relationship between the home address of the multicast source and the proxy care-of address of the multicast source.

The registration unit is also used to: when the multicast source is moving, register an updated binding relationship between the proxy care-of address of the multicast source and the home address of the multicast source to the BMR.

Another device for forwarding a multicast message provided in the embodiment includes: a receiving unit, a decapsulating unit and a sending unit, wherein:

the receiving unit is used to: receive a multicast message for which a multicast header is encapsulated sent by a rendezvous point RP, wherein a target address of the multicast header is a multicast address, and a source address of the multicast header is a proxy care-of address of a multicast source; and the decapsulating unit is used to: look up a binding relationship between a home address of the multicast source and the proxy care-of address of the multicast source according to the proxy care-of address of the multicast source, looking up a multicast forwarding table entry according to the home address of the multicast source, and when outgoing interface information corresponding to the multicast forwarding table entry indicates that it is required to forward towards outward of a domain, decapsulate the multicast header of an outer layer of the multicast message; and the sending unit is used to: according to the outgoing interface information corresponding to the multicast forwarding table entry, send an original multicast message obtained through the decapsulation to a designated router DR to which a multicast listener outside a domain belongs.

Another device for establishing a multicast path provided in the embodiment includes: a receiving unit, a table entry generating unit and a sending unit, wherein:

the receiving unit is used to: receive a subscribe message sent by a multicast listener outside a domain of a multicast source;

the table entry generating unit is used to: look up a binding relationship between a home address of the multicast source and a proxy care-of address S-pCoA of the multicast source according to the home address of the multicast source in the subscribe message, obtain the S-pCoA of the multicast source, and generate a (S-pCoA, multicast group address G) multicast forwarding table entry; and the sending unit is used to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry.

An outgoing interface list corresponding to the (S-pCoA, G) multicast forwarding table entry is for interfaces for receiving the channel subscribe message.

Another device for forwarding a multicast message provided in the embodiment includes: a receiving unit, a decapsulating unit and a sending unit, wherein:

the receiving unit is used to: receive a multicast message for which a multicast header is encapsulated sent by a designated router DR to which a multicast source belongs, wherein a target address of the multicast header is a multicast address G, and a source address of the multicast header is a proxy care-of address S-pCoA of the multicast source;

the decapsulating unit is used to: decapsulate the multicast header of an outer layer of the multicast message; and the sending unit is used to: query a generated (S-pCoA, G) multicast forwarding table entry, and send an original multicast message obtained through the decapsulation to a DR to which a multicast listener outside a domain belongs.

The decapsulating unit is used to: before decapsulating the multicast header of the outer layer of the multicast message, query the (S-pCoA, G) multicast forwarding table entry, perform reverse path forwarding RPF check, and after the check is passed, decapsulate the multicast header of the outer layer of the multicast message.

Another device for registering a multicast source provided in the embodiment includes: a receiving unit, an encapsulating unit and a sending unit, wherein:

the receiving unit is used to: receive a multicast message of a multicast source; the encapsulating unit is used to: encapsulate the multicast message as a registration message; and the sending unit is used to: send the registration message to a rendezvous point RP, wherein a proxy care-of address of the multicast source and a path establishment flag bit are carried in the registration message, the path establishment flag bit is used for indicating the RP to establish a shortest path tree SPT branch between the RP and a designated router DR to which the multicast source belongs according to the proxy care-of address of the multicast source.

After receiving the registration message, according to the path establishment flag bit, the RP saves a binding relationship between the proxy care-of address of the multicast source carried in the registration message and a home address of the multicast source.

Another device for establishing a multicast path provided in the embodiment includes: a receiving unit and a sending unit, wherein:

the receiving unit is used to: receive a registration message of a multicast listener; and the sending unit is used to: send a join message with a protocol independent multicast PIM join attribute hop by hop in a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs.

Another device for establishing a multicast path provided in the embodiment includes: a receiving unit and a sending unit, wherein:

the receiving unit is used to: receive a message of applying for joining a channel sent by a multicast listener; and the sending unit is used to: send a join message with a protocol independent multicast PIM join attribute hop by hop to a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs.

After receiving a multicast message sent by the multicast source, through the SPT branch between the DR to which the multicast source belongs and the DR to which the multicast listener belongs, the DR to which the multicast source belongs forwards the multicast message to the DR to which the multicast listener belongs, wherein, all routers along the SPT branch perform reverse path forwarding RPF check according to the proxy care-of address of the multicast source.

Another device for establishing a multicast path provided in the embodiment includes: a receiving unit, a querying unit and a sending unit, wherein:

the receiving unit is used to: receive a channel subscribe message sent by a multicast listener outside a domain of a multicast source;

the querying unit is used to: according to a home address of the multicast source, look up a local binding cache table entry to obtain a proxy care-of address corresponding to the home address of the multicast source, and add a protocol independent multicast PIM join attribute into the channel subscribe message, wherein the proxy care-of address of the multicast source is carried in the PIM join attribute; and the sending unit is used to: send a channel subscribe message in which the PIM join attribute is added hop by hop in a multicast source direction, trigger a designated router DR to which the multicast source belongs and routers passed by the channel subscribe message to perform RPF check according to the proxy care-of address of the multicast source, and complete an establishment of a shortest path tree SPT branch between with the DR to which the multicast source belongs.

After receiving a multicast message sent by the multicast source, the DR to which the multicast source belongs forwards the multicast message to the receiving unit through the SPT branch, wherein, all routers along the SPT branch perform RPF check according to the proxy care-of address of the multicast source and forward the multicast message; and after receiving the multicast message, the receiving unit forwards the multicast message to a DR to which the multicast listener belongs.

It should be noted that the embodiments in the present document and the characteristics in the embodiments can be optionally combined with each other in the condition of no conflict.

Certainly, the present document can still have other various embodiments, the skilled familiar to the art can make various corresponding changes and transformations according to the present document without departing from the spirit and essence of the present document, and these corresponding changes and transformations shall all fall into the protection scope of the appended claims of the present document.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

INDUSTRIAL APPLICABILITY

In the embodiments of the present document, with the proxy care-of address of the multicast source in a PMIPv6 domain, and through the provided method for establishing the multicast path, the multicast routing efficiency and the multicast performance can be improved.

What is claimed is:

1. A method for registering a multicast source, wherein the method comprises:

after receiving an original multicast message of a multicast source, a designated router DR to which the multicast source belongs encapsulating another multicast header for the original multicast message, wherein a target address of the another multicast header is a multicast address, and a source address of the another multicast header is a proxy care-of address of the multicast source; and encapsulating the re-encapsulated multicast message into a registration message to send to a rendezvous point; wherein a target address in the header of the original multicast message is the multicast address, and a source address in the header of the original multicast message is a home address of the multicast source, wherein, the DR to which the multicast source belongs is a mobile access gateway MAG to which the multicast source belongs, and the proxy care-of address of the multicast source is an address of the MAG to which the multicast source belongs, preferably, wherein, encapsulating the re-encapsulated multicast message into a registration message to send to a rendezvous point comprises:

after encapsulating the re-encapsulated multicast message into the registration message according to an unicast encapsulation, the MAG to which the multicast source belongs sending the registration message to the rendezvous point by means of unicast, wherein a source address in an outer-layer encapsulation of the registration message is the address of the MAG, and a target address in an outer-layer encapsulation of the registration message is an address of the rendezvous point, or, wherein, encapsulating the re-encapsulated multicast message as a registration message to send to a rendezvous point comprises:

after encapsulating the re-encapsulated multicast message into the registration message according to an anycast encapsulation, the MAG to which the multicast source belongs sending the registration message by means of anycast, wherein a source address in an outer-layer encapsulation of the registration message is the address of the MAG to which the multicast source belongs, and a target address in an outer-layer encapsulation of the registration message is an anycast address of a anycast-rendezvous point set;

or, wherein the method comprises:

a designated router DR to which a multicast source belongs registering a binding relationship between a home address of the multicast source and a proxy care-of address of the multicast source to a border multicast router BMR, and completing a registration of the binding relationship between the home address of the multicast source and the proxy care-of address of the multicast source, wherein, when the multicast source is moving, a DR to which the multicast source moves registers an updated binding relationship between the proxy care-of address of the multicast source and the home address of the multicast source to the BMR;

or,
wherein the method comprises:
after receiving an original multicast message of a multicast source, a designated router DR to which the multicast source belongs encapsulating the original multicast message as a registration message, sending the registration message to a rendezvous point RP, wherein a proxy care-of address of the multicast source and a path establishment flag bit are carried in the registration message, the path establishment flag bit is used for indicating the RP to establish a shortest path tree SPT branch between the RP and the DR to which the multicast source belongs according to the proxy care-of address of the multicast source,
wherein, after receiving the registration message, according to the path establishment flag bit, the RP saves a binding relationship between the proxy care-of address of the multicast source carried in the registration message and a home address of the multicast source.

2. A method for forwarding a multicast message, wherein the method comprises:
after receiving a multicast message sent by a rendezvous point, a designated router DR to which a multicast listener belongs removing a multicast header of the multicast message to obtain an original multi cast message, and sending the original multicast message to the multicast listener, wherein, a target address of the removed multicast header is a multicast address, and a source address of the removed multicast header is a proxy care-of address of a multicast source; wherein a target address in the header of the original multicast message is the multicast address, and a source address in the header of the original multicast message is a home address of the multicast source;
or,
wherein the method comprises:
after receiving an original multicast message sent by a multicast source, a designated router DR to which the multicast source belongs encapsulating another multicast header for the original multicast message, wherein a target address of the another multicast header is a multicast address G, and a source address of the another multicast header is a proxy care-of address S-pCoA of the multicast source; and forwarding a multicast message for which the another multicast header is encapsulated according to a generated (S-pCoA, G) multicast forwarding table entry, wherein, the multicast message reaches a rendezvous point along a shortest path tree SPT branch, and all routers passed along the SPT branch forward the multicast message for which the another multicast header is encapsulated according to the generated (S-pCoA, G) multicast forwarding table entry;
or,
wherein the method comprises:
after receiving an original multicast message of a multicast source, a designated router DR to which the multicast source belongs encapsulating another multicast header for the multicast message, wherein a target address of the another multicast header is a multicast address G, and a source address of the another multicast header is a proxy care-of address S-pCoA of the multicast source; and
according to a generated (S-pCoA, G) multicast forwarding table entry, through a shortest path tree SPT branch between the DR to which the multicast source belongs and a DR to which a multicast listener belongs, the DR to which the multicast source belongs forwarding a multicast message for which the another multicast header is encapsulated to the DR to which the multicast listener belongs;
wherein, after receiving the multicast message, the DR to which the multicast listener belongs queries the generated (S-pCoA, G) multicast forwarding table entry to perform reverse path forwarding RPF check, after the check is passed, removes the another multicast header of the multicast message to obtain an original multicast message, and according to the generated (home address S-HoA of multicast source, G) forwarding table entry, sends the original multicast message to the multicast listener;
or,
wherein the method comprises:
a border multicast router BMR receiving a multicast message for which another multicast header is encapsulated sent by a rendezvous point RP, wherein a target address of the another multicast header is a multicast address, and a source address of the another multicast header is a proxy care-of address of a multicast source; and
the BMR looking up a binding relationship between a home address of the multicast source and the proxy care-of address of the multicast source according to the proxy care-of address of the multicast source, looking up a multicast forwarding table entry according to the home address of the multicast source, when outgoing interface information corresponding to the multicast forwarding table entry indicates that it is required to forward towards outward of a domain, decapsulating the another multicast header of an outer layer of the multicast message to obtain an original multicast message, and according to the outgoing interface information corresponding to the multicast forwarding table entry, sending the original multicast message to a designated router DR to which a multicast listener outside a domain belongs;
or,
wherein the method comprises:
a border multicast router BMR receiving a multicast message for which another multicast header is encapsulated sent by a designated router DR to which a multicast source belongs, wherein a target address of the another multicast header is a multicast address G, and a source address of the another multicast header is a proxy care-of address S-pCoA of the multicast source; and
the BMR decapsulating the another multicast header of an outer layer of the multicast message to obtain an original multicast message, querying a generated (S-pCoA, G) multicast forwarding table entry, and sending the original multicast message to a DR to which a multicast listener outside a domain belongs,
wherein, before decapsulating the another multicast header of the outer layer of the multicast message, the BMR queries the (S-pCoA, G) multicast forwarding table entry, performs reverse path forwarding RPF check, and after the check is passed, decapsulates the another multicast header of the outer layer of the multicast message;
or,
wherein, the BMR receiving a multicast message for which another multicast header is encapsulated sent by an MAG to which a multicast source belongs comprises:

after receiving the original multicast message sent by the multicast source, the DR to which the multicast source belongs encapsulating the another multicast header for the multicast message, and according to the generated (S-pCoA, G) multicast forwarding table entry, through a shortest path tree SPT branch between the DR to which the multicast source belongs and the BMR, sending the multicast message for which the another multicast header is encapsulated to the BMR.

3. A method for establishing a multicast path, wherein the method comprises:

after receiving a registration message sent by a designated router DR to which a multicast source belongs, a rendezvous point removing an outer-layer encapsulation of the registration message to obtain a multicast message, and obtaining a multicast header of the multicast message, wherein a source address of the multicast header is a proxy care-of address S-pCoA of the multicast source, and a target address of the multicast header is a multicast address G, and the multicast message comprises an original multicast message, wherein a target address in the header of the original multicast message is the multicast address, and a source address in the header of the original multicast message is a home address of the multicast source; and the rendezvous point sending a join message to the DR to which the multicast source belongs, and establishing a shortest path tree SPT branch between the rendezvous point and the DR to which the multicast source belongs, wherein, routers passed along the SPT branch generate a (S-pCoA, G) multicast forwarding table entry, wherein, the DR to which the multicast source belongs is a mobile access gateway MAG to which the multicast source belongs, and the proxy care-of address of the multicast source is an address of the MAG to which the multicast source belongs;

or, wherein the method comprises:

after receiving a message of applying for joining a channel sent by a multicast listener, a designated router DR to which the multicast listener belongs querying a local mobility anchor LMA to obtain a proxy care-of address S-pCoA of a multicast source, and generating a (S-pCoA, multicast address G) multicast forwarding table entry; and the DR to which the multicast listener belongs sending a channel subscribe message hop by hop in a multicast source direction corresponding to a channel (S-pCoA, G), and establishing a shortest path tree SPT branch between the DR to which the multicast listener belongs and a DR to which the multicast source belongs, wherein, routers passed along the SPT branch and the DR to which the multicast source belongs generate a (S-pCoA, G) multicast forwarding table entry;

or, wherein the method comprises:

after receiving a subscribe message sent by a multicast listener outside a domain of a multicast source, a border multicast router BMR looking up a binding relationship between a home address of the multicast source and a proxy care-of address S-pCoA of the multicast source according to the home address of the multicast source in the subscribe message, obtaining the S-pCoA of the multicast source, and generating a (S-pCoA, multicast group address G) multicast forwarding table entry; and the BMR sending a channel subscribe message hop by hop in a multicast source direction corresponding to a channel (S-pCoA, G), and establishing a shortest path tree SPT branch between the BMR and a designated router DR to which the multicast source belongs, wherein, routers passed along the SPT branch and the DR to which the multicast source belongs generate a (S-pCoA, G) multicast forwarding table entry;

wherein, an outgoing interface list corresponding to the (S-pCoA, G) multicast forwarding table entry generated by the BMR is for interfaces for the BMR receiving the channel subscribe message;

or, wherein the method comprises:

after receiving a registration message of a multicast listener, a rendezvous point RP sending a join message with a protocol independent multicast PIM join attribute hop by hop in a multicast source direction, wherein a proxy care-of address of a multicast source is carried in the PIM join attribute; triggering a designated router DR to which the multicast source belongs and routers passed by the join message to perform reverse path forwarding RPF check according to the proxy care-of address of the multicast source carried in the PIM join attribute, and completing an establishment of a shortest path tree SPT branch between the RP and the DR to which the multicast source belongs;

or, wherein the method comprises:

after receiving a message of applying for joining a channel sent by a multicast listener, a designated router DR to which the multicast listener belongs sending a join message with a protocol independent multicast PIM join attribute hop by hop in a multicast source direction, wherein a proxy care-of address of a multicast source is carried in the PIM join attribute; triggering a DR to which the multicast source belongs and routers passed by the join message to perform reverse path forwarding RPF check according to the proxy care-of address of the multicast source carried in the PIM join attribute, and completing an establishment of a shortest path tree SPT branch between the DR to which the multicast listener belongs and the DR to which the multicast source belongs;

wherein, after receiving a multicast message sent by the multicast source, through the SPT branch between the DR to which the multicast source belongs and the DR to which the multicast listener belongs, the DR to which the multicast source belongs forwards the multicast message to the DR to which the multicast listener belongs, wherein, all routers along the SPT branch perform reverse path forwarding RPF check according to the proxy care-of address of the multicast source;

or, wherein the method comprises:

after receiving a channel subscribe message sent by a multicast listener outside a domain of a multicast source, according to a home address of the multicast source, a local mobility anchor LMA looking up a local binding cache table entry to obtain a proxy care-of address corresponding to the home address of the multicast source; and the LMA adding a protocol independent multicast PIM join attribute into the channel subscribe message, wherein the proxy care-of address of the multicast source is carried in the PIM join attribute; sending a channel subscribe message in which the PIM join attribute is added hop by hop in a multicast source direction, triggering a designated router DR to which the multicast source belongs and routers passed by the channel subscribe message to perform RPF check according to the proxy care-of address of the multicast source, and completing an establishment of a shortest path tree SPT branch between the LMA and the DR to which the multicast source belongs;

wherein, after receiving an original multicast message sent by the multicast source, the DR to which the multicast source belongs forwards the original multicast message to the LMA through the SPT branch between the DR to which the multicast source belongs and the LMA, wherein, all routers along the SPT branch perform RPF check according to the proxy care-of address of the original multicast source and forward the original multicast message; and after receiving the original multicast message, the LMA forwards the original multicast message to a DR to which the multicast listener belongs.

4. A device for registering a multicast source, wherein the device comprises: a receiving unit, an encapsulating unit and a sending unit, wherein:

the receiving unit is configured to: receive an original multicast message of the multicast source;

the encapsulating unit is configured to: encapsulate another multicast header for the original multicast message, wherein a target address of the another multicast header is a multicast address, and a source address of the another multicast header is a proxy care-of address of the multicast source; and encapsulate the re-encapsulated multicast message into a registration message; and the sending unit is configured to: send the registration message to a rendezvous point, wherein, a target address in the header of the original multicast message is the multicast address, and a source address in the header of the original multicast message is a home address of the multicast source; the proxy care-of address of the multicast source is an address of a mobile access gateway MAG to which the multicast source belongs;

or, wherein the device comprises: a registration unit, wherein, the registration unit is configured to: register a binding relationship between a home address of the multicast source and a proxy care-of address of the multicast source to a border multicast router BMR, and complete a registration of the binding relationship between the home address of the multicast source and the proxy care-of address of the multicast source;

or, wherein the device comprises: a receiving unit, an encapsulating unit and a sending unit, wherein:

the receiving unit is configured to: receive an original multicast message of a multicast source;

the encapsulating unit is configured to: encapsulate the original multicast message as a registration message; and the sending unit is configured to: send the registration message to a rendezvous point RP, wherein a proxy care-of address of the multicast source and a path establishment flag bit are carried in the registration message, the path establishment flag bit is used for indicating the RP to establish a shortest path tree SPT branch between the RP and a designated router DR to which the multicast source belongs according to the proxy care-of address of the multicast source.

5. A device for forwarding a multicast message, wherein the device comprises: a receiving unit, a decapsulating unit and a sending unit, wherein:

the receiving unit is configured to: receive a multicast message sent by a rendezvous point;

the decapsulating unit is configured to: remove a multicast header of the multicast message to obtain an original multicast message, wherein, a target address of the removed multicast header is a multicast address, and a source address of the removed multicast header is a proxy care-of address of a multicast source; and the sending unit is configured to: send the original multicast message to a multicast listener, wherein a target address in the header of the original multicast message is the multicast address, and a source address in the header of the original multicast message is a home address of the multicast source;

or, wherein the device comprises: a receiving unit, an encapsulating unit and a sending unit, wherein:

the receiving unit is configured to: receive an original multicast message sent by a multicast source;

the encapsulating unit is configured to: encapsulate another multicast header for the multicast message, wherein a target address of the another multicast header is a multicast address G, and a source address of the another multicast header is a proxy care-of address S-pCoA of the multicast source; and the sending unit is configured to: forward a multicast message for which the another multicast header is encapsulated according to a generated (S-pCoA, G) multicast forwarding table entry, wherein, the multicast message reaches a rendezvous point along a shortest path tree SPT branch, and all routers passed along the SPT branch forward the multicast message for which the another multicast header is encapsulated according to the generated (S-pCoA, G) multicast forwarding table entry, or, wherein the device comprises: a receiving unit, an encapsulating unit and a sending unit, wherein:

the receiving unit is configured to: receive an original multicast message of a multicast source;

the encapsulating unit is configured to: encapsulate another multicast header for the multicast message, wherein a target address of the another multicast header is a multicast address G, and a source address of the another multicast header is a proxy care-of address S-pCoA of the multicast source; and the sending unit is configured to: according to a generated (S-pCoA, G) multicast forwarding table entry, through a shortest path tree SPT branch between with a designated router DR to which a multicast listener belongs, forward a multicast message for which the another multicast header is encapsulated to the DR to which the multicast listener belongs, or, wherein the device comprises: a receiving unit, a decapsulating unit and a sending unit, wherein:

the receiving unit is configured to: receive a multicast message;

the decapsulating unit is configured to: query a generated (S-pCoA, G) multicast forwarding table entry to perform reverse path forwarding RPF check, after the check is passed, remove a multicast header of the multicast message to obtain an original multicast message; and the sending unit is configured to: according to the generated (home address S-HoA of multicast source, G) forwarding table entry, send the original multicast message to a multicast listener, or, wherein the device comprises: a receiving unit, a decapsulating unit and a sending unit, wherein:

the receiving unit is configured to: receive a multicast message for which another multicast header is encapsulated sent by a rendezvous point RP, wherein a target address of the another multicast header is a multicast address, and a source address of the another multicast header is a proxy care-of address of a multicast source; and the decapsulating unit is configured to: look up a binding relationship between a home address of the multicast source and the proxy care-of address of the multicast source according to the proxy care-of address of the multicast source, looking up a multicast forwarding table entry according to the home address of the multicast source, and when outgoing interface information corresponding to the multicast forwarding table entry indicates that it is required to forward towards outward of a domain, decapsulate the another multicast header of an outer layer of the multicast message to obtain an original multicast message; and the sending unit is configured to: according to the outgoing interface information corresponding to the multicast forwarding table entry, send the original multicast message to a designated router DR to which a multicast listener outside a domain belongs, or, wherein the device comprises: a receiving unit, a decapsulating unit and a sending unit, wherein:

the receiving unit is configured to: receive a multicast message for which another multicast header is encapsulated sent by a designated router DR to which a multicast source belongs, wherein a target address of the another multicast header is a multicast address G, and a source address of the another multicast header is a proxy care-of address S-pCoA of the multicast source;

the decapsulating unit is configured to: decapsulate the another multicast header of an outer layer of the multicast message to obtain an original multicast message; and the sending unit is configured to: query a generated (S-pCoA, G) multicast forwarding table entry, and send the original multicast message to a DR to which a multicast listener outside a domain belongs.

6. A device for establishing a multicast path, wherein the device comprises: a receiving unit, a decapsulating unit and a sending unit, wherein:

the receiving unit is configured to: receive a registration message sent by a designated router DR to which a multicast source belongs;

the decapsulating unit is configured to: remove an outer-layer encapsulation of the registration message to obtain a multicast message, and obtain a multicast header of the multicast message, wherein a source address of the multicast header is a proxy care-of address S-pCoA of the multicast source, and a target address of the multicast header is a multicast address G, and the multicast message comprises an original multicast message, wherein a target address in the header of the original multicast message is the multicast address, and a source address in the header of the original multicast message is a home address of the multicast source; and the sending unit is configured to: send a join message to the DR to which the multicast source belongs, and establish a shortest path tree SPT branch between with the DR to which the multicast source belongs, wherein, routers passed along the SPT branch generate a (S-pCoA, G) multicast forwarding table entry, or, wherein the device comprises: a receiving unit, a table entry generating unit and a sending unit, wherein:

the receiving unit is configured to: receive a message of applying for joining a channel sent by a multicast listener;

the table entry generating unit is configured to: query a local mobility anchor LMA to obtain a proxy care-of address S-pCoA of a multicast source, and generate a (S-pCoA, multicast address G) multicast forwarding table entry; and the sending unit is configured to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry, or, wherein the device comprises: a receiving unit, a table entry generating unit and a sending unit, wherein:

the receiving unit is configured to: receive a subscribe message sent by a multicast listener outside a domain of a multicast source;

the table entry generating unit is configured to: look up a binding relationship between a home address of the multicast source and a proxy care-of address S-pCoA of the multicast source according to the home address of the multicast source in the subscribe message, obtain the S-pCoA of the multicast source, and generate a (S-pCoA, multicast group address G) multicast forwarding table entry; and the sending unit is configured to: send a channel subscribe message hop by hop in a multicast source direction corresponding to a channel (S-pCoA, G), and establish a shortest path tree SPT branch between with a designated router DR to which the multicast source belongs, wherein, routers passed along the SPT branch and the DR to which the multicast source belongs generate a (S-pCoA, G) multicast forwarding table entry, or, wherein the device comprises: a receiving unit and a sending unit, wherein:

the receiving unit is configured to: receive a registration message of a multicast listener; and the sending unit is configured to: send a join message with a protocol independent multicast PIM join attribute hop by hop in a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs, or, wherein the device comprises: a receiving unit and a sending unit, wherein:

the receiving unit is configured to: receive a message of applying for joining a channel sent by a multicast listener; and the sending unit is configured to: send a join message with a protocol independent multicast PIM join attribute hop by hop in a multicast source direction, wherein a proxy care-of address of a multicast source is carried in the PIM join attribute; trigger a designated router DR to which the multicast source belongs and routers passed by the join message to perform reverse path forwarding RPF check according to the proxy care-of address of the multicast source carried in the PIM join attribute, and complete an establishment of a shortest path tree SPT branch between with the DR to which the multicast source belongs, or, wherein the device comprises: a receiving unit, a querying unit and a sending unit, wherein:

the receiving unit is configured to: receive a channel subscribe message sent by a multicast listener outside a domain of a multicast source;

the querying unit is configured to: according to a home address of the multicast source, look up a local binding cache table entry to obtain a proxy care-of address corresponding to the home address of the multicast source, and add a protocol independent multicast PIM join attribute into the channel subscribe message, wherein the proxy care-of address of the multicast source is carried in the PIM join attribute; and the sending unit is configured to: send a channel subscribe message in which the PIM join attribute is added hop by hop in a multicast source direction, trigger a designated router DR to which the multicast source belongs and routers passed by the channel subscribe message to perform RPF check according to the proxy care-of address of the multicast source, and complete an establishment of a shortest path tree SPT branch between with the DR to which the multicast source belongs.

* * * * *